(12) United States Patent
Hoff

(10) Patent No.: US 8,799,851 B2
(45) Date of Patent: Aug. 5, 2014

(54) MANAGEMENT OF INTEGRATED ENTERPRISE PROCESSES

(75) Inventor: Roland Hoff, Walldorf (DE)

(73) Assignee: SAP AG, Walldorf (DE)

( * ) Notice: Subject to any disclaimer, the term of this patent is extended or adjusted under 35 U.S.C. 154(b) by 383 days.

(21) Appl. No.: 12/884,881

(22) Filed: Sep. 17, 2010

(65) Prior Publication Data

US 2012/0072883 A1 Mar. 22, 2012

(51) Int. Cl.
- G06F 9/44 (2006.01)
- G06F 9/445 (2006.01)
- G06Q 10/06 (2012.01)

(52) U.S. Cl.
CPC . *G06F 8/61* (2013.01); *G06Q 10/06* (2013.01)
USPC .......................................... 717/104; 717/105

(58) Field of Classification Search
None
See application file for complete search history.

(56) References Cited

U.S. PATENT DOCUMENTS

| | | | |
|---|---|---|---|
| 5,930,512 | A | 7/1999 | Boden et al. |
| 6,662,199 | B1 * | 12/2003 | Flight et al. .................. 707/694 |
| 7,403,948 | B2 | 7/2008 | Ghoneimy et al. |
| 8,650,533 | B2 | 2/2014 | Hoff |
| 2002/0178252 | A1 | 11/2002 | Balabhadrapatruni et al. |
| 2003/0177046 | A1 | 9/2003 | Socha-Leialoha |
| 2006/0005162 | A1 | 1/2006 | Tseng et al. |
| 2006/0070025 | A1 | 3/2006 | Mauceri et al. |
| 2006/0123414 | A1 | 6/2006 | Fors et al. |
| 2008/0021754 | A1 | 1/2008 | Horn et al. |
| 2008/0040191 | A1 | 2/2008 | Chakravarty et al. |
| 2008/0052613 | A1 | 2/2008 | Maine |
| 2008/0155431 | A1 | 6/2008 | Bombolowsky |
| 2010/0043002 | A1 | 2/2010 | Fujiwara |
| 2012/0185587 | A1 | 7/2012 | O'Sullivan et al. |

OTHER PUBLICATIONS

"SAP Modeling Handbook—Modeling Standards", Process Hierarchy—SAP Community Network Wiki, retrieved on Jul. 21, 2010 from http://wiki.sdn.sap.com, 4 pages.
Gschwind, T., et al, "Applying Patterns during Business Process Modeling", BPM 2008, LNCS vol. 5240, 2008, pp. 4-19.
Reichert, M., et al, "Extending a Business Process Modeling Tool with Process Configuration Facilities: The Provop Demonstrator", In: CEUR proceedings of the BPM '09 Demonstration Track, Business Process Management Conference 2009 (BPM'09), Sep. 2009, Ulm, Germany, 5 pages.
Non-Final Office Action for U.S. Appl. No. 12/884,857, mailed Apr. 24, 2013, 23 pages.
Notice of Allowance for U.S. Appl. No. 12/884,857, mailed Oct. 1, 2013, 6 pages.
Non-Final Office Action for U.S. Appl. No. 12/884,912, mailed Feb. 25, 2014, 23 pages.
Non-Final Office Action Response for U.S. Appl. No. 12/884,912, filed on May 13, 2014, 12 pages.

* cited by examiner

*Primary Examiner* — Qamrun Nahar
(74) *Attorney, Agent, or Firm* — Brake Hughes Bellermann LLP

(57) ABSTRACT

A computer system can include an enterprise process selection module configured to receive a plurality of enterprise process definitions representing a plurality of existing enterprise processes implemented on a target system. The computer system can include a proposed solution package manager configured to select, based on the plurality of enterprise process definitions, a proposed solution package including a new enterprise process, and to define an indicator of a mandatory operational relationship between the new enterprise process and a first existing enterprise process from the plurality of existing enterprise processes, and an indicator of an optional operational relationship between the new enterprise process and a second existing enterprise process from the plurality of existing enterprise processes. Also, a solution package generator can be configured to receive an indicator that the optional operational relationship has been selected for binding to the second existing enterprise process from the plurality of existing enterprise processes.

20 Claims, 10 Drawing Sheets

MANAGEMENT OF INTEGRATED ENTERPRISE PROCESSES

TECHNICAL FIELD

This description relates to integration of enterprise processes implemented on a computer system.

BACKGROUND

Some known enterprise software packages include numerous features that are intended to meet the needs of a variety of users. In some computer systems, these known enterprise software packages may include at least some features, and/or upgrades to these features, that can needlessly consume computing resources and/or that are dispersed throughout portions of the enterprise software packages. In some instances, the features that are available within the enterprise software package may not even meet the specific needs of a user of the computer system. In addition, the features of the enterprise software package may cause inconveniences during initial installation and/or upgrading of the enterprise software package that may not be desirable to some users. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include an enterprise process selection module configured to receive a plurality of enterprise process definitions representing a plurality of existing enterprise processes implemented on a target system. The computer system can include a proposed solution package manager configured to select, based on the plurality of enterprise process definitions, a proposed solution package including a new enterprise process, and configured to define an indicator of a mandatory operational relationship between the new enterprise process and a first existing enterprise process from the plurality of existing enterprise processes, and an indicator of an optional operational relationship between the new enterprise process and a second existing enterprise process from the plurality of existing enterprise processes. The computer system can include a solution package generator configured to receive an indicator that the optional operational relationship has been selected for binding to the second existing enterprise process from the plurality of existing enterprise processes, and configured to define, based on the indicator of the optional operational relationship selection, an implementation of the new enterprise process in an integrated solution package.

In another general aspect, a non-transitory computer-readable storage medium can store code representing instructions that when executed are configured to cause a processor to perform a process. The code can include code to receive a plurality of enterprise process definitions representing a plurality of existing enterprise processes implemented on a target system, and select, based on the plurality of enterprise process definitions, a proposed solution package including a new enterprise process. The code can also include code to define an indicator of a mandatory operational relationship between the new enterprise process and a first existing enterprise process from the plurality of existing enterprise processes, and an indicator of an optional operational relationship between the new enterprise process and a second existing enterprise process from the plurality of existing enterprise processes. The code can include code to receive an indicator that the optional operational relationship has been selected for binding to the second existing enterprise process from the plurality of existing enterprise processes.

In yet another general aspect, a method can include executing instructions recorded on a non-transitory computer-readable storage media using at least one processor. The method can include receiving a plurality of enterprise process definitions representing a plurality of existing enterprise processes implemented on a target system, and selecting, based on the plurality of enterprise process definitions, a proposed solution package including a new enterprise process. The method can include defining an indicator of a mandatory operational relationship between the new enterprise process and a first existing enterprise process from the plurality of existing enterprise processes, and an indicator of an optional operational relationship between the new enterprise process and a second existing enterprise process from the plurality of existing enterprise processes. The method can also include receiving an indicator that the n optional operational relationship has been selected for binding to the second existing enterprise process from the plurality of existing enterprise process, and defining, based on the indicator of the optional operational relationship selection, an implementation of the new enterprise process in an integrated solution package.

The details of one or more implementations are set forth in the accompanying drawings and the description below. Other features will be apparent from the description and drawings, and from the claims.

DETAILED DESCRIPTION

Figure 1:
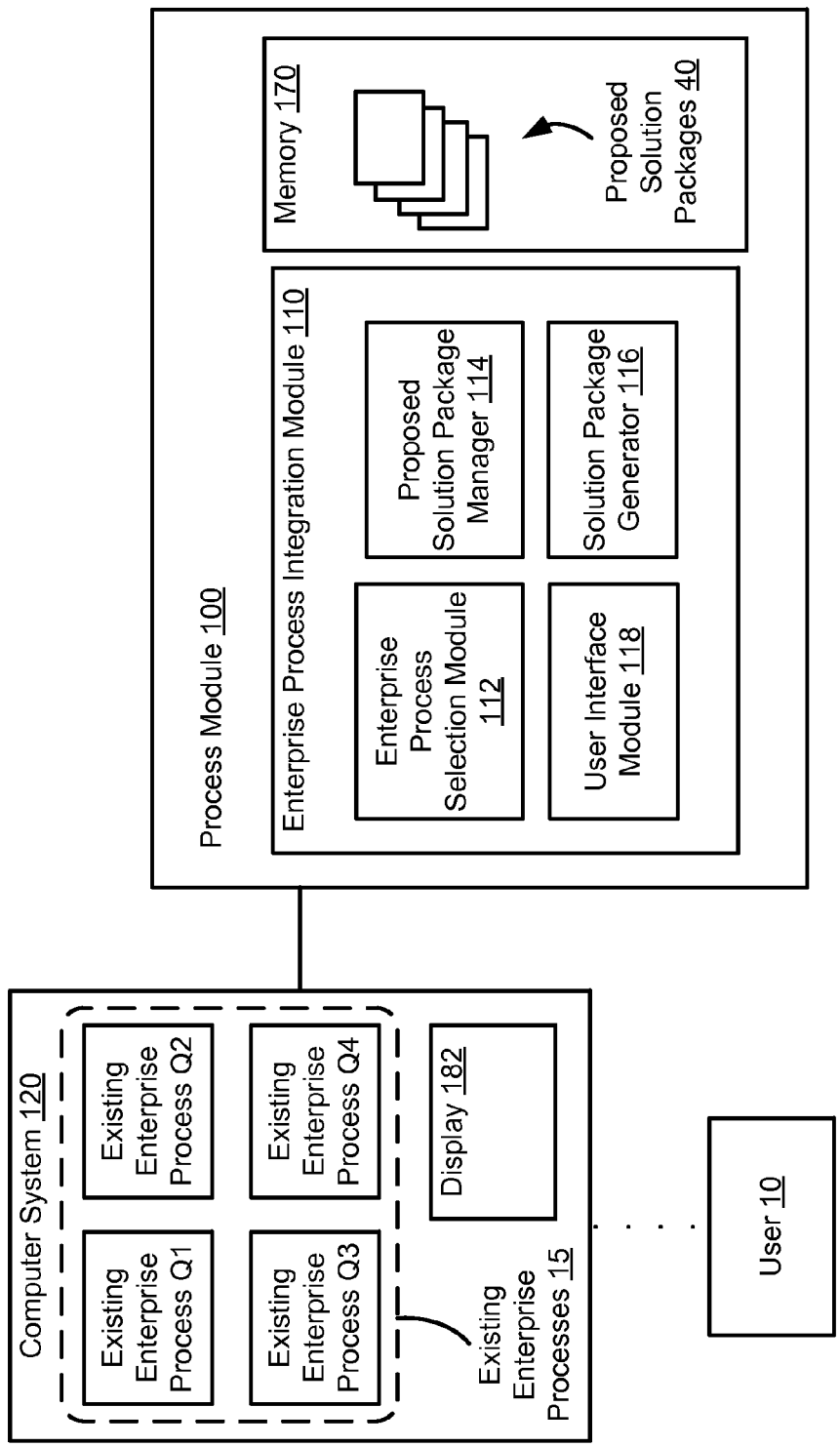
FIG. 1 is a block diagram that illustrates an enterprise process integration module of a process module.

FIG. 1 is a block diagram that illustrates an enterprise process integration module 110 of a process module 100. In this embodiment, the enterprise process integration module 110 is configured to define a solution package associated with one or more of the existing enterprise processes Q1 through Q4 of a computer system 120 (also can be referred to as a target system). The existing enterprise processes Q1 through Q4 can collectively be referred to as existing enterprise processes 15. Specifically, the enterprise process integration module 110 is configured to define a solution package that adds the functionality associated with a new enterprise process to one or more of the existing enterprise processes 15 implemented (e.g., installed) at the computer system 120. One or more of the existing enterprise processes 15 can be, for example, an enterprise process for sales order processing, an enterprise process for invoice enterprise processing, an enterprise process for outbound delivery, and/or so forth.

For example, the process module 100 can be configured to define a solution package that includes an implementation of a new enterprise process that operate with (e.g., can be accessed by, can be triggered by) existing enterprise process Q1 and operate with existing enterprise process Q4. Accordingly, separate instances of the new enterprise process do not need to be included in each of existing enterprise process Q1 and existing enterprise process Q4. Instead, the functionality of the new enterprise process is consolidated in the solution package. This type of solution package can be referred to as an integrated solution package. Because each of these existing enterprise processes Q1 and Q4 trigger functionality associated with a common new enterprise process that is integrated into an integrated solution package, these existing enterprise processes can be referred to as integrated existing enterprise processes. In other words, portions new enterprise processes that can operate with the existing enterprise processes have been integrated into the integrated solution package. In some embodiments, the new enterprise process (or a portion thereof) can be triggered by, for example, a process step (e.g., instances of a triggering process step) included in the existing enterprise processes Q1 and Q4.

Although not shown in FIG. 1, each of the existing enterprise processes 15 can be associated with an enterprise process definition. An enterprise process definition can include information associated with one or more functions of an existing enterprise process. For example, an enterprise process definition associated with existing enterprise process Q2 can include enterprise process values representing the process steps defining the existing enterprise process Q2, the functions of the process steps of the existing enterprise process Q2, interfaces with one or more portions of the existing enterprise process Q2, the version of the existing enterprise process Q2, the relationship of the existing enterprise process Q2 with other existing enterprise processes from the existing enterprise processes 15, data that can be processed within the existing enterprise process Q2 (and/or a portion thereof), and/or so forth.

As discussed herein, an integrated solution package associated with an existing enterprise process can be any type of hardware and/or software combination that can be used to integrate the existing enterprise processes 15 at the computer system 120. In other words, the integrated solution package can be an implementation of (or can be used to implement) an integrated solution package associated with the existing enterprise processes 15 at the computer system 120. For example, the integrated solution package can be an executable software module that can be installed on the computer system 120.

As shown in FIG. 1, the enterprise process integration module 110 includes an enterprise process selection module 112. The enterprise process selection module 112 is configured to select one or more of the existing enterprise processes 15 that are eligible for integration. An existing enterprise process can be referred to as being eligible for integration when at least a portion of the existing enterprise process can be associated with (e.g., trigger at least a portion of) an integrated solution package.

The enterprise process selection module 112 can be configured to determine whether or not one or more portions (e.g., process steps) of the existing enterprise processes 15 can be configured to trigger a new enterprise process integrated into an integrated solution package based on one or more eligibility conditions (not shown). An eligibility condition is any type of condition that can be used to determine the eligibility of one or more of the existing enterprise processes 15 for integration. An eligibility condition can be used to enforce one or more eligibility prerequisites that can be, for example, defined by a user (e.g., an administrator). Thus, an eligibility condition can be defined based on one or more eligibility prerequisites.

For example, an eligibility condition may be satisfied for a particular existing enterprise process from the existing enterprise processes 15 when the existing enterprise process can be configured to interface with (e.g., send data to, received data from) an integrated solution package. As a specific example, existing enterprise process Q1 may be eligible for integration because existing enterprise process Q1 can be interfaced with (e.g., can trigger functionality of) an integrated solution package, while existing enterprise process Q2 may not be eligible for integration because existing enterprise process Q2 cannot be interfaced with (e.g., cannot trigger functionality of) an integrated solution package. In some embodiments, an eligibility condition may be satisfied for a particular existing enterprise process from the existing enterprise processes 15 when the existing enterprise process can be configured to trigger functionality associated with a new enterprise process that can be integrated into an integrated solution package. In some embodiments, one or more eligibility conditions can be stored in (e.g., stored in an eligibility condition database) and/or accessed from a memory 170. These example eligibility conditions are presented by way of example only, and are not inclusive of all of the types of eligibility conditions that can be used to determine the eligibility of one or more of the existing enterprise processes 15 for integration.

In some embodiments, the enterprise process selection module 112 can be configured to determine the eligibility of one or more of the existing enterprise processes 15 for integration based on an enterprise process definition associated with one or more of the existing enterprise processes 15 satisfying one or more eligibility conditions. For example, the enterprise process selection module 112 can be configured to determine that at least a portion of existing enterprise process Q4 is eligible for integration into an integrated solution package based on a portion of an enterprise process definition of existing enterprise process Q4 that satisfies an eligibility condition.

The enterprise process integration module 110 also includes a proposed solution package manager 114. The proposed solution package manager 114 is configured to select (or define) one or more proposed solution packages 40 stored in the memory 170 for the existing enterprise processes 15. Each of the proposed solution packages 40 can represent a potential integrated solution package that can be used to integrate one or more of the existing enterprise processes 15. A proposed solution package that represents a potential integrated solution package for integration of an existing enterprise process can be referred to as a proposed solution package for the existing enterprise process or can be referred to as a proposed solution package for integration of the existing enterprise process.

The proposed solution packages 40 can include, or can be associated with, various selectable integration features (also can be referred to as proposed integration features) that can be used to define an integrated solution package for one or more of the existing enterprise processes 15. In other words, the proposed solution packages 40 can each be, or can include, a definition (e.g., a map, a set of parameter values, a database) of possible integration features that can be included in an integrated solution package. In some embodiments, one or more of the proposed solution packages 40 can be visually represented. In some embodiments, one or more of the selectable integration features can be selected by a user such as user 10 and the selected integration features can be included in the integrated solution package for one or more existing enterprise processes 15. Accordingly, the proposed solution packages 40 can each function as a tool that can be used (e.g., used by a user) to define an integrated solution package for one or more the existing enterprise processes 15. Said differently, the proposed solution packages 40 can be used to define integrated solution packages that are actually installed on the computer system 120.

The proposed solution package manager 114 can be configured to determine whether or not one or more of the proposed solution packages 40 represents a potential integrated solution package for one or more of the existing enterprise processes 15 based on one or more solution package conditions (not shown). A solution package condition is any type of condition that can be used to select a proposed solution package for an existing enterprise process. A solution package condition can be used to enforce one or more prerequisites for a solution package to be proposed for integration of an existing enterprise process. Thus, a solution package condition can be defined based on one or more solution package prerequisites (which can be defined by a user such as an administrator).

For example, a solution package condition may be satisfied for a particular proposed solution package from the proposed solution packages 40 when the proposed solution package can interface with at least one of the existing enterprise processes 15 (or subset that is eligible for integration). As a specific example, a proposed solution package can be selected by the proposed solution package manager 114 for existing enterprise process Q1 when the proposed solution package includes a new enterprise process (e.g., a proposed new enterprise process) that can interface with the existing enterprise process Q1 (and is eligible for integration).

In some embodiments, one or more solution package conditions may satisfied if one or more of existing enterprise processes 15 and/or the proposed solution packages 40 are modified. For example, a proposed solution package from the proposed solution packages 40 may be associated with a first program version (e.g., program version 3.0) and the existing enterprise processes 15 may be associated with a second program version (e.g., program version 1.0). The proposed solution package from the proposed solution packages 40 may be selected by the propose solution package manager 114 if the existing enterprise processes 15 are modified (e.g., upgraded) to a program version that is compatible with the first program version. These example solution package conditions are presented by way of example only, and are not inclusive of all of the types of solution package conditions that can be used to select proposed solution packages for the existing enterprise processes 15.

In some embodiments, the proposed solution package manager 114 can be configured to select one or more of the proposed solution packages 40 for at least a subset of the existing enterprise processes 15 based on at least a portion of an enterprise process definition associated with the existing enterprise processes 15 satisfying one or more solution package conditions. For example, the proposed solution package manager 114 can be configured to select a proposed solution package from proposed solution packages 40 for integration of existing enterprise process Q2 based on a portion of an enterprise process definition of existing enterprise process Q2 that satisfies a solution package condition.

In some embodiments, multiple solution packages from the proposed solution packages 40 can be selected for one or more of the existing enterprise processes 15 by the proposed solution package manager 114. The proposed solution package manager 114 can be configured to receive an indicator that only a portion of the multiple solution packages are to be used as a tool to define an integrated solution package. In such embodiments, an indicator that only a portion of the multiple solution packages are to be used can be triggered (e.g., triggered via selection) by the user 10.

In some embodiments, the proposed solution package manager 114 can be configured to select a proposed solution package from the proposed solution packages 40 only if the proposed solution package can be used to integrate more than one of the existing enterprise processes 15. For example, the proposed solution package manager 114 can be configured to select a first proposed solution package from the proposed solution packages 40 for triggering of a new enterprise process common to both existing enterprise process Q2 and existing enterprise process Q4. A second proposed solution package may not be selected from the proposed solution packages 40 because the second proposed solution package is related to a new enterprise process associated with only one existing enterprise process from the existing enterprise processes 15.

In some embodiments, prerequisites that may satisfy one or more solution package conditions and/or eligibility conditions be presented to the user 10. These prerequisites may be presented to the user 10 so that the user 10 can optionally make modifications to satisfy one or more of the solution package conditions and/or one or more of eligibility conditions. For example, the enterprise process integration module 110 (e.g., via a user interface module 118 of the enterprise process integration module 110) can be configured to notify the user 10 that a proposed solution package from the proposed solution packages 40 may be used to integrate one or more of the existing enterprise processes 15 if the one or more existing enterprise processes 15 is modified (e.g., upgraded to a specified program version). Accordingly, one or more of the existing enterprise processes 15 can be modified (e.g., upgraded to at least the specified program version) to be compatible with an integrated solution package defined based on a proposed solution package from the proposed solution packages 40. In some embodiments, one or more solution package conditions and/or eligibility conditions may be overridden (e.g., manually disabled, ignored) by the user 10.

As shown in FIG. 1, the enterprise process integration module 110 includes a solution package generator 116 configured to define an integrated solution package based on one or more proposed solution packages 40. The solution package generator 116 can be configured to define the integrated solution package based on one or more of the selectable integration features of a proposed solution package being selected. In some embodiments, the selectable integration features of the proposed solution package for an existing enterprise process (e.g., existing enterprise process Q1 from the existing enterprise processes 15) can be selected by a user (such as user 10).

In some embodiments, an integrated solution package can be, or can include, one or more databases, any type of executable software module such as a computer program based on, but not limited to, micro-code or micro-instructions, machine instructions, such as produced by a compiler, code used to produce a web service, and files containing higher-level instructions that are executed by a computer using an interpreter. For example, or more portions of a solution package may be implemented using Java, C++, or other programming languages (e.g., object-oriented programming languages) and development tools. In some embodiments, an integrated solution package for one or more existing enterprise processes can define at least a portion of one or more applications or can be associated with one or more applications of the computer system 120. In some embodiments, an integrated solution package can be, or can include, a user interface component associated with one or more existing enterprise processes, and the user interface component can be configured for display (e.g., rendering). In some embodiments, one or more integrated solution packages can have, or can be, a background process with functionality that is not visible (i.e., not displayed).

In some embodiments, a portion of a proposed solution package can have one or more proposed operational relationships (which can be proposed integration features) with one or more existing enterprise processes. For example, an operational relationship between a new enterprise process included in a proposed solution package and an existing enterprise process can be classified as a mandatory operational relationship based on an enterprise process definition associated with the existing enterprise process. Accordingly, if an integrated solution package is defined based on the proposed solution package, the integrated solution package must include the operational relationship between the new enterprise process (included in the integrated solution package) and the existing enterprise process. In other words, the existing enterprise process must be configured to operate with the new enterprise process (included in the integrated solution package) based on the mandatory operational relationship.

In some embodiments, an operational relationship between a new enterprise process included in a proposed solution package and an existing enterprise process can be classified as an optional operational relationship based on an enterprise process definition associated with the existing enterprise process. Accordingly, if an integrated solution package is defined based on the proposed solution package, the integrated solution package could (if selected as an integration feature to include in the integrated solution package) include the operational relationship between the new enterprise process (included in the integrated solution package) and the existing enterprise process. In other words, the existing enterprise process could be configured to operate with the new enterprise process (included in the integrated solution package) based on the optional operational relationship. More details related to mandatory operational relationships and optional operational relationships are described in connection with, for example, FIGS. 3 through 6B.

In some embodiments, the integrated solution package can include configuration data associated with a configuration file defining at least a portion of the existing enterprise process and/or new enterprise process (or portion thereof) for which the integrated solution package is defined. Configuration data can be included in a database repository and can be configured to define one or more functions of one or more new enterprise processes associated with one or more existing enterprise processes.

The enterprise process integration module 110 includes a user interface module 118 configured to define one or more user interfaces (not shown in FIG. 1) that can be presented to a user 10. The user interfaces can be presented to the user 10 via a display 182 of the computer system 120. The user interface module 118 can be configured to manage (e.g., send, manipulate, trigger execution of) user interfaces through which users such as user 10 can access (e.g., use, trigger) the functionality of the process module 100 (e.g., the functionality of the enterprise process integration module 110). For example, prerequisites related to compatibility of one or more of the proposed solution packages 40 with one or more of the existing enterprise processes 15 can be presented to the user 10 via a user interface of the user interface module 118. As another example, selectable integration features (e.g., proposed integration features) related to proposed solution packages 40 can be can be presented to the user 10 via a user interface of the user interface module 118.

In some embodiments, one or more of the user interfaces can be, for example, a browser-based user interface that includes various buttons, links, controls, services, and/or so forth that can be used by a user (such as user 10) to access the functionality of the process module 100. The user interface(s) can be rendered within the display 182 for the user 10 so that the user 10 can access one or more functions of the process module 100. For example, the user 10 can, using the computer system 120, access a user interface served by the user interface module 118 to a browser application of the computer system 120. The user 10 can then use the user interface to trigger one or more functions associated with the computer system 120.

As shown in FIG. 1, the functionality of the process module 100 can be accessed (e.g., can be triggered) via the computer system 120 on which the existing enterprise processes 15 are installed. Specifically, the functionality of the process module 100 is accessed via the computer system 120 and the display 182 of the computer system 120. In some embodiments, the functionality of the process module 100 can be accessed (e.g., can be triggered) by the user via a terminal device associated with the computer system 120.

Although not shown, in some embodiments the process module 100 (or portions thereof) can be configured to operate within, for example, a data center (e.g., a cloud computing environment), a computer system, one or more server/host devices, and/or so forth. In some embodiments, the functionality of the process module 100 can be distributed to several devices.

In some embodiments, one or more portions of the components shown in the process module 100 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the enterprise process integration module 110 can be, or can include, a software module configured for execution by at least one processor (not shown). The processor can be configured to execute one or more instructions and can include one or more co-processors and/or memory portions. In some embodiments, the functionality of the components can be included in different modules and/or components than those shown in FIG. 1. For example, although not shown, the functionality of the enterprise process integration module 110 can be included in a different module than the enterprise process integration module 110, or divided into several different modules.

Although not shown, in some embodiments, the memory 170 can be implemented as more than one memory component (e.g., more than one random-access memory (RAM) component or disk drive memory) within the process module 100. In some embodiments, the memory 170 can be a database memory. In some embodiments, the memory 170 can be, or can include, a non-local memory (e.g., a memory not physically included within the process module 100). For example, the memory 170 can be, or can include, a memory shared by multiple devices (not shown). In some embodiments, the memory 170 can be associated with a server device (not shown) within a network and configured to serve the process module 100.

In some embodiments, the process module 100 (or portions thereof) and/or the computer system 120 (or portions thereof) can be configured to operate within a network. In other words, the process module 100 (or portions thereof) and/or the computer system 120 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The computer system 120 can be, for example, a wired device and/or a wireless device (e.g., wi-fi enabled device) and can be, for example, a computing entity (e.g., a personal computing device), a mobile phone, a personal digital assistant (PDA), a server device (e.g., a web server), a host device, and/or so forth. The computer system 120 can be configured to operate based on one or more platforms (e.g., one or more similar or different platforms) that can include one or more types of hardware, software, firmware, operating systems, runtime libraries, and/or so forth. In some embodiments, computer system 120 can represent a cluster of devices (e.g., a server farm).

In some embodiments, the enterprise process integration module 110 (e.g., the solution package generator 116 of the enterprise process integration module 110) can be configured to define an integrated solution package associated with any portion of an existing enterprise process. For example, the enterprise process integration module 110 can be configured to define an integrated solution package related to individual functions (e.g., process steps or portions thereof) of a new enterprise process for an existing enterprise process. As a specific example, the enterprise process integration module 110 can be configured to define an integrated solution package that includes a function (e.g., a process step or portions thereof) that can be triggered by both existing enterprise process Q1 and existing enterprise process Q3 (e.g., triggered by instances of a triggering process step included in both existing enterprise process Q1 and existing enterprise process Q3). The eligibility of the existing enterprise processes Q1 and Q3 for integration can be determined based on one or more eligibility conditions and/or one or more enterprise process definitions associated with the function triggered by existing enterprise processes Q1 and Q3. A proposed solution package can be selected from the proposed solution packages 40 based on one or more solution package conditions and/or one or more enterprise process definitions associated with the function that can be triggered by existing enterprise processes Q1 and Q3.

In some embodiments, the enterprise process integration module 110 (e.g., the solution package generator 116 of the enterprise process integration module 110) can be configured to define an integrated solution package for a variant of an existing enterprise process. A variant of an existing enterprise process can be a customized version of the existing enterprise process. For example, existing enterprise process Q1 and existing enterprise process Q2 can each be different variants of the same existing enterprise process. Existing enterprise process Q1 may include triggering capabilities that do not exist in enterprise process Q2, and vice versa. As a specific example, existing enterprise process Q1 can include one or more process steps (or portions thereof) that can be configured to trigger a new enterprise process that are not also included in existing enterprise process Q2, and vice versa.

A variant of an existing enterprise process can include a combination of process steps and/or functions of the process steps selected for inclusion in an existing enterprise process. For example, a set of process steps (that are available for optional selection) can be selected for inclusion in an existing enterprise process. Certain functions (that are available for optional selection) can be associated with (e.g., define at least a portion of) a subset of the process steps from the set of process steps. The combination of the set of process steps and the functions associated with the subset of process steps can collectively define a variant of the existing enterprise process. Process steps that are selected for inclusion in an existing enterprise process can be referred to as being bound to the existing enterprise process and/or bound to process steps required as part of the existing enterprise process. Functions that are selected for inclusion in an existing enterprise process in conjunction with a process step can be referred to as being bound to the process step. In some embodiments, at least some of the process steps of a variant of an existing enterprise process can be configured to trigger a new enterprise process that can be included in an integrated solution package.

In some embodiments, one or more of the existing enterprise processes 15 can include mandatory process steps that define the core functionality of the existing enterprise process(es) 15. An existing enterprise process that includes only mandatory process steps can be referred to as a standard version of the existing enterprise process. Optional process steps, when added to (e.g., appended to) the core functionality of the standard version of the existing enterprise process, can define a variant (or customized version) of the existing enterprise process. Also, optional functionality of the process steps of an existing enterprise process can define variants of the existing enterprise process.

In some embodiments, the proposed solution package manager 114 can be configured to select a proposed solution package from the proposed solution packages 40 only for mandatory portions of the existing enterprise processes 15. In other words, the proposed solution package manager 114 may not select a proposed solution package from the proposed solution packages 40 if the proposed solution package is related only to (e.g., can only be triggered from) optional portions of one or more of the existing enterprise processes 15.

In some embodiments, the enterprise process selection module 112 may determine that one or more existing enterprise processes 15 may be ineligible for integration because the existing enterprise process(es) 15 is an ineligible variant of an existing enterprise process. For example, one or more of the existing enterprise processes 15 may be classified by the enterprise process selection module 112 as being ineligible for integration because the existing enterprise process(es) 15 includes an optional process step (or mandatory process step)

that prevents the existing enterprise process(es) 15 from being associated with an integration solution package. An example of an existing enterprise process with optional new enterprise processes that can be used to define variants of the existing enterprise process is shown in FIG. 2.

Figure 2:
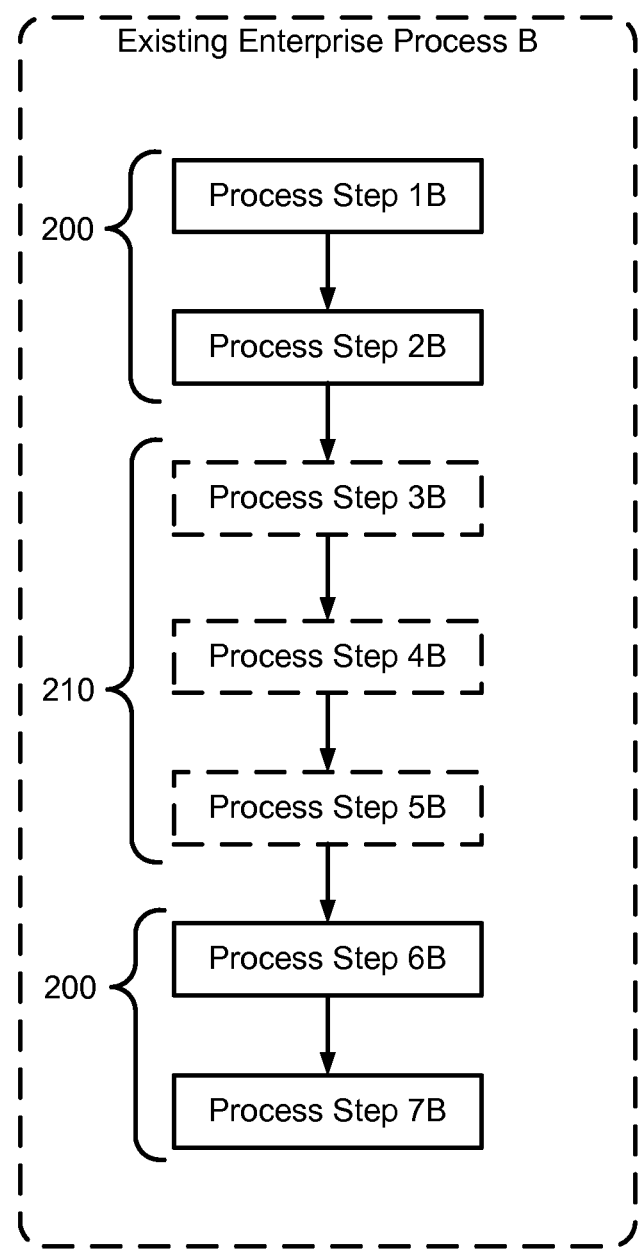
FIG. 2 is a block diagram that illustrates an existing enterprise process that includes mandatory process steps and optional process steps.

FIG. 2 is a block diagram that illustrates an existing enterprise process B that includes mandatory process steps 200 and optional process steps 210. The mandatory process steps 200, which include process steps 1B, 2B, 6B, and 7B, define the core functionality of the existing enterprise process, and process steps 3B, 4B, and 5B are optional process steps 210. In some embodiments, at least some of the process steps of the existing enterprise process B can be configured to trigger a new enterprise process that can be included in an integrated solution package.

A flow of information between the process steps of existing enterprise process B is represented by arrows. For example, optional process step 3B is related to mandatory process step 2B based on a function associated with the optional process step 3B being configured to process information (e.g., data) produced by a function of the mandatory process step 2B. Similarly, optional process step 5B is related to mandatory process step 6B based on a function associated with the optional process step 5B being configured to send information (e.g., data) to a function of the mandatory process step 6B.

Each of the process steps from the existing enterprise process B can be referred to by their classification as a mandatory process step 200 or as an optional process step 210 (which are types of process steps). For example, process step 3B, which is an optional process step 210 and can be referred to as optional process step 3B.

In this embodiment, the mandatory process steps 200 are represented by rectangles with solid lines. In other words, representations of the mandatory process steps 200 include rectangles with solid lines. Also, the optional process steps 210 are represented by rectangles with dashed lines. In other words, representations of the optional process steps 210 include rectangles with dashed lines.

Various combinations of the optional process steps 210 can be combined with (e.g., bound to) the mandatory process steps 200 to define variants of the existing enterprise process B. For example, process step 3B can be combined with the mandatory process steps 200 to define a first variant of the existing enterprise process B, and process steps 4B and 5B can be combined with the mandatory process steps 200 to define a second variant of the existing enterprise process. A variant of the existing enterprise process B that includes only the mandatory process steps 200 can be referred to as standard enterprise process B. These variants of the existing enterprise process B are not shown in FIG. 2.

In some embodiments, the optional process steps 210 can be dependent from the mandatory process steps 200, but not dependent from other optional process steps 210. For example, in some embodiments, a variant of the existing enterprise process B must include all of the mandatory process steps 200, but can include only a subset of the optional process steps 210. In other words, a variant of the existing enterprise process B can include all of the mandatory process steps 200 and only, for example, process step 5B. This variant of the existing enterprise process be can be operational without the preceding optional process steps—process step 3B and process step 4B.

The process steps shown in existing enterprise process B can represent process steps within an existing enterprise process. For example, the process steps of the existing enterprise process B can be representations of the process steps of a sales order processing enterprise process. Accordingly, mandatory process step 1B can represent a main process step related to creation, updating, rejecting a sales order, etc., and mandatory process step 2B can represent a process step related to an availability to purchase, promise, check, and/or update. Optional process step 3B can represent an optional credit check process step, optional process step 4B can represent an optional advertising campaign determination step, and optional process step 5B can represent an optional managerial accounting/auditing process step. Mandatory process step 6B can represent a mandatory purchase order request process step, and mandatory process step 7B can represent a mandatory delivery creation process step.

In some embodiments, one or more of the process steps shown in existing enterprise B can be configured to function as a background process that is not visible. In other words, the process step may neither require an input value from a user nor produce a result that may be visible to a user via, for example, a user interface. In some embodiments, one or more of the process steps shown in existing enterprise B may require user input in order for the process step to be executed. For example, a process step from existing enterprise process B may require an input value (from a user) so that one or more functions of the process step can be performed. In some embodiments, one or more of the process steps shown in existing enterprise process B can be configured to produce a result that may be visible to a user via, for example, a user interface. For example, a process step from the existing enterprise process B can be a process step that can produce a result that can be presented to a user via a user interface (e.g., a notification via the user interface). As a specific example, if the process step is a process step related to a credit check, the result may be a credit score associated with a user of the existing enterprise process B. Although not shown in FIG. 2, a new enterprise process can be, or can include, one or more process steps similar to those included in existing enterprise process B.

Figure 3:
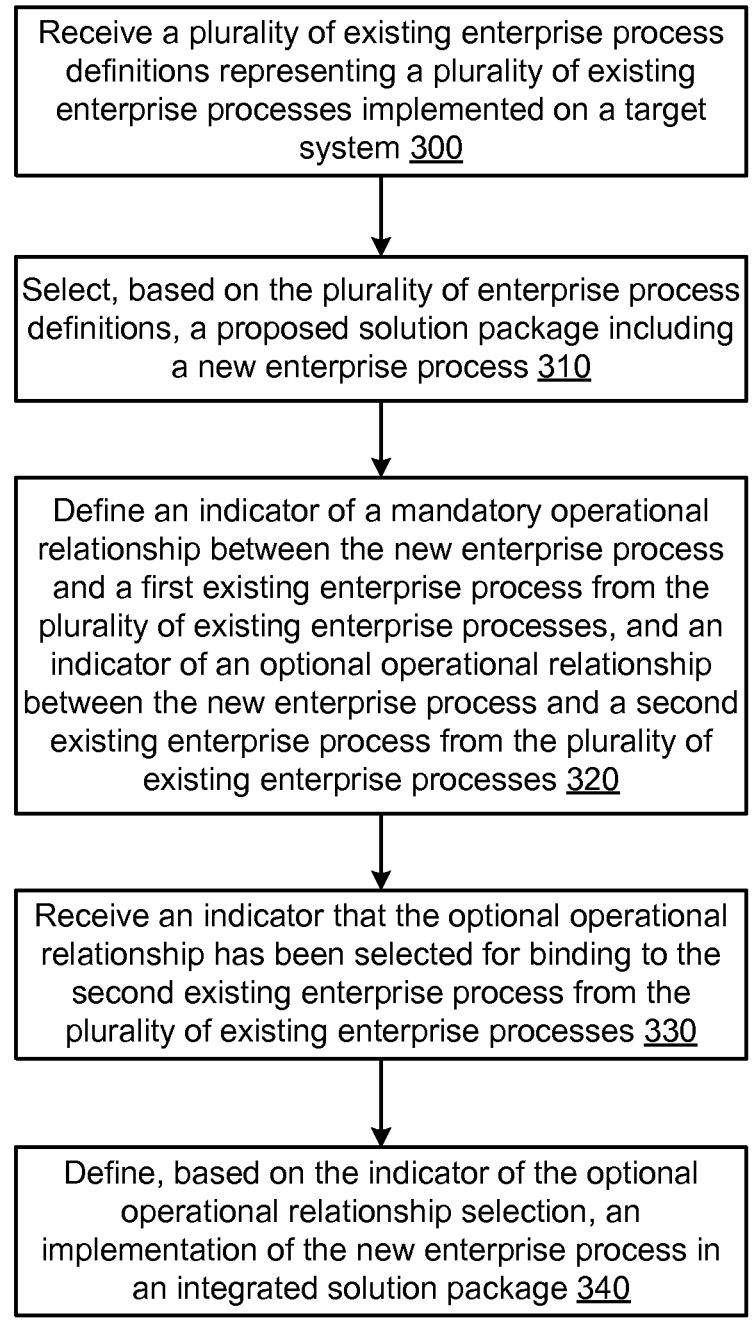
FIG. 3 is a flowchart that illustrates a method for defining an integrated solution package.

FIG. 3 is a flowchart that illustrates a method for defining an integrated solution package. At least some portions of the method shown in FIG. 3 can be performed by a process module such as process module 100 shown in FIG. 1.

As shown in FIG. 3, a plurality of enterprise process definitions representing a plurality of existing enterprise processes implemented on a target system are received (block 300). In some embodiments, the plurality of enterprise process definitions can be stored in a database associated with the computer system where the plurality of existing enterprise processes are implemented. In some embodiments, at least a portion of the plurality of enterprise process definitions can be defined based on an analysis of the plurality of existing enterprise processes implemented at the computer system. In some embodiments, at least a portion of the plurality of existing enterprise processes can be selected based on an eligibility condition being satisfied.

Based on the plurality of enterprise process definitions, a proposed solution package including a new enterprise process is selected (block 310). The proposed solution package can be selected from a set of proposed solution packages (such as proposed solution package is 40 shown in FIG. 1). In some embodiments, the new enterprise process can be referred to as a proposed new enterprise process. In some embodiments, the proposed solution package can be based on a portion of a new enterprise process (e.g., a function of a new enterprise process). In some embodiments, the proposed solution package can be selected based on a solution package condition being satisfied.

An indicator of a mandatory operational relationship between the new enterprise process and a first existing enterprise process from the plurality of existing enterprise processes, and an indicator of an optional operational relationship between the new enterprise process and a second existing enterprise process from the plurality of existing enterprise processes are defined (block 320). In some embodiments, the new enterprise process can be a new enterprise process that can be triggered by each of the first existing enterprise process and the second existing enterprise process. In some embodiments, the operational relationship between the new enterprise process and the first existing enterprise process can be classified as a mandatory operational relationship based on an enterprise process definition associated with the first existing enterprise process. In some embodiments, the operational relationship between the new enterprise process and the second existing enterprise process can be classified as an optional operational relationship based on an enterprise process definition associated with the second existing enterprise process. In some embodiments, one or more of the indicators can be defined by a proposed solution package manager such as proposed solution package manager 114 shown in FIG. 1.

An indicator that the optional operational relationship has been selected for binding to the second existing enterprise process from the plurality of existing enterprise process is received (block 330). In some embodiments, the optional operational relationship can be selected for binding to the second existing enterprise process by, for example, a user. In some embodiments, the indicator can be received at a solution package generator (such as solution package generator 116 shown in FIG. 1).

Based on the indicator of the optional operational relationship selection, an implementation of the new enterprise process in an integrated solution package is defined (block 340). In some embodiments, the integrated solution package can be an executable software solution package that can be installed on a computer system. In some embodiments, the integrated solution package can be defined by a solution package generator (such as solution package generator 116 shown in FIG. 1).

Figure 4:
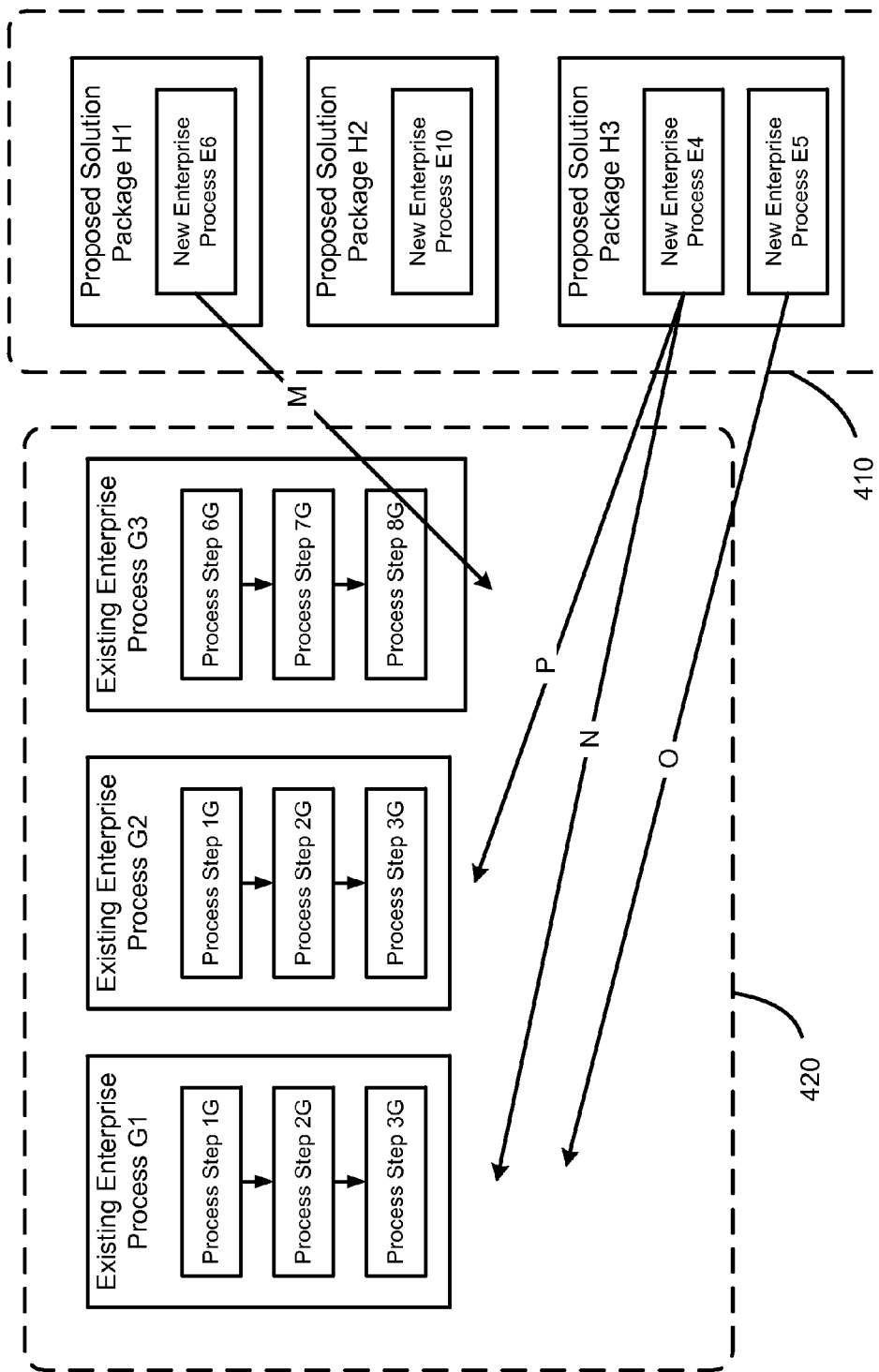
FIG. 4 is a block diagram that illustrates proposed solution packages and existing enterprise processes.

FIG. 4 is a block diagram that illustrates proposed solution packages 410 and existing enterprise processes 420. The proposed solution packages 410 include proposed solution package H1, proposed solution package H2, and proposed solution package H3. The existing enterprise processes 420 include existing enterprise process G1, existing enterprise process G2, and existing enterprise process G3. In this embodiment, the proposed solution packages 410 each include new enterprise processes that are an upgrade to a version of each of the existing enterprise processes 420. In some embodiments, the new enterprise processes included in the proposed solution packages 410 can be referred to as proposed new enterprise processes. Although not shown in FIG. 4, the process steps of the existing enterprise processes 420 can include any combination of optional process steps and mandatory process steps.

In some embodiments, the existing enterprise processes can be any type of enterprise process. For example, the existing enterprise process G1 can be a quotation enterprise process, the existing enterprise process G2 can be a sales order from stock enterprise process, and the existing enterprise process G3 can be an outbound delivery enterprise process.

As shown in FIG. 4, proposed new enterprise process E6 of the proposed solution package H1 can be triggered by the existing enterprise process G3 (as represented by arrow M). In this embodiment, because the proposed new enterprise process E6 of the proposed solution package H1 can operate with (e.g., can be triggered by, can trigger, can be accessed by) one or more process steps of the existing enterprise processes 420, the proposed solution package H1 may be selected for integration of at least existing enterprise process G3. In other words, the proposed solution package H1 may be selected as a potential integrated solution package for integration of the existing enterprise processes 420.

In some alternative embodiments, because the proposed new enterprise process E6 of the proposed solution package H1 can operate with (e.g., can be triggered by) one or more process steps of only one of the existing enterprise processes 420, the proposed solution package H1 may not be selected for integration of any of the existing enterprise processes 420. In other words, the proposed solution package H1 may not be selected as a potential integrated solution package for integration of any of the existing enterprise processes 420.

As shown in FIG. 4, proposed new enterprise processes E4 and E5 of the proposed solution package H3 can operate with (e.g., can be connected with, can be triggered by) one or more process steps of the new enterprise processes E4 and E5 (as respectively represented by arrow N and O). Also, as illustrated by arrow P, proposed new enterprise process E4 of the proposed solution package H3 can operate with (e.g., can be triggered by, can trigger) one or more process steps of the existing enterprise process G2. The operational relationship of proposed new enterprise process E4 with existing enterprise process G2 can be considered an upgrade to existing enterprise process G2 because proposed new enterprise process E4 currently does not operate with existing enterprise process G2. Similarly, proposed new enterprise processes E4 and E5 can be considered an upgrade to existing enterprise process G1.

In some embodiments, the new enterprise processes can be any type of enterprise process. For example, the new enterprise process E4 can be a credit check enterprise process, and the new enterprise process E5 can be a credit update enterprise process.

Although not shown in FIG. 4, the proposed new enterprise processes (e.g., new enterprise process E4, new enterprise process E5) can be triggered (as an upgrade) by any of the process steps already included in existing enterprise processes (e.g., enterprise process G2). For example, new enterprise process E4 can be triggered by at least a portion of process step 1G, 2G, and/or 3G of existing enterprise process G1. In other words, one or more of the process steps included in the existing enterprise processes can function as an interface with the new enterprise processes. In some embodiments, a process step configured to trigger functionality of a new enterprise process can be referred to as a triggering process step.

In this embodiment, because the proposed solution package H3 includes at least one new enterprise process—proposed new enterprise process E4—that can be associated with existing enterprise processes G1 and G2, the proposed solution package H3 may be selected for integration for at least these existing enterprise processes. In other words, the proposed solution package H3 may be selected as a potential integrated solution package for operation with each of existing enterprise process G1 and existing enterprise process G2.

As shown in FIG. 4, the proposed solution package H1 includes a proposed new enterprise process E10. The proposed new enterprise process E10 cannot be triggered by of the process steps of any of the existing enterprise processes 420. Thus, proposed solution package H2 may not be selected for integration of any of the existing enterprise processes 420.

In some embodiments, a proposed solution package can be selected for integration of several existing enterprise processes when the proposed solution package includes multiple new enterprise processes (e.g., multiple proposed new enterprise processes) that each can operate with only one existing enterprise process. For example, a proposed solution package can include a first new enterprise process that can be operate with (e.g., triggered by) a process step included in a first existing enterprise process. The proposed solution package can also include a second new enterprise process that can be operate with (e.g., triggered by) a process step included in a second existing enterprise process. Although each of the new enterprise processes of the proposed solution package can operate with (e.g., triggered by) a process step from only one existing enterprise process, the proposed solution package may be used for integration of the first existing enterprise process and the second existing enterprise process because the proposed solution package is associated with multiple existing enterprise processes.

In some embodiments, the existing enterprise processes 420 (and portions thereof) can be represented by at least one enterprise process definition. In addition, one or more of the conditions described above can be defined within one or more solution package conditions. A proposed solution package manager, such as proposed solution package manager 114 shown in FIG. 1, can be configured to select one or more of the proposed solution packages 410 based on the at least one enterprise process definition and the one or more solution package conditions.

Figure 5A:
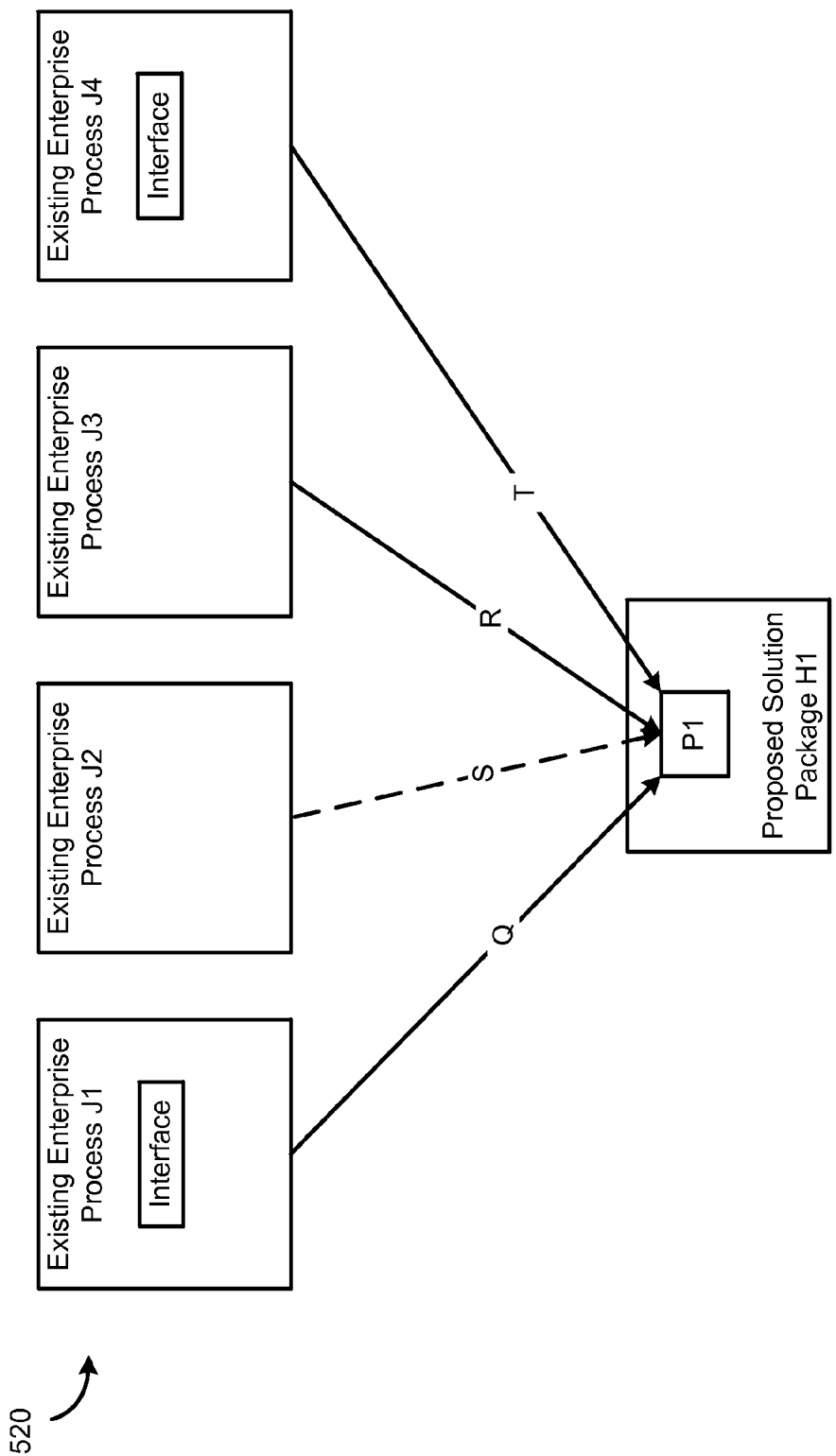
FIG. 5A is a block diagram that illustrates a proposed solution package selected for integration of existing enterprise processes.

FIG. 5A is a block diagram that illustrates a proposed solution package H1 selected for integration of existing enterprise processes 520. FIG. 5A illustrates integration features associated with the proposed solution package H1 that can be, if selected, implemented in an integrated solution package.

As shown in FIG. 5A, the existing enterprise processes 520 include existing enterprise processes J1 through J4. Operational relationships between the existing enterprise processes J1 through J4 and the proposed solution package H1 are also illustrated as arrows Q through T. Because the operational relationships represented by arrows Q through T are associated with proposed solution package H1, the operational relationships can be referred to as proposed operational relationships. Although not shown in FIG. 5, each of the existing enterprise processes 520 can include one or more process steps that can each be mandatory process steps or optional process steps.

The proposed solution package H1 includes a new enterprise process P1 that can operate with existing enterprise process J1 and existing enterprise process J4. Because new enterprise process P1 is included in the proposed solution package H1, new enterprise process P1 can be referred to as proposed new enterprise process P1.

As shown in FIG. 5, existing enterprise process J1 and existing enterprise process J4 each include an interface that can be used to trigger functionality of the new enterprise process P1. The interface included in existing enterprise process J1 and the interface included in existing enterprise process J4 are both dormant interfaces that have not yet been activated to trigger (e.g., not yet configured to trigger) one or more functions of the new enterprise process P1. Accordingly, the interface included in existing enterprise process J1 and the interface included in existing enterprise process J4 can be activated (e.g., configured) so that the interface included in existing enterprise process J1 and/or the interface included in existing enterprise process J4 can operate with (e.g., trigger, use) one or more functions of the new enterprise process P1. For example, if the new enterprise process P1 is implemented in an integrated solution package, the triggering capability of the interface of existing enterprise process J1 can be activated so that the existing enterprise process J1 can operate with (e.g., trigger, use) the functionality of new enterprise process P1.

An interface can be, for example, a software and/or hardware interface that can be used to trigger (e.g., trigger execution of), for example, one or more functions (e.g., functions of new enterprise process P1). In some embodiments, the interface can be an application programming interface (API). In some embodiments, the interface can be a process step (e.g., instances of a process step) that can be referred to as a trigger process step or as a triggering process step (e.g., instances of a triggering process step). In some embodiments, one or more parameter values can be sent and/or received via an interface. For example, if implemented in a solution package, the interface of existing enterprise process J1 can be configured to trigger one or more functions associated with new enterprise process P1.

In this embodiment, an integrated solution package defined (e.g., defined by a solution package generator) based on the proposed solution package H1 can include an instance of new enterprise process P1 (i.e., proposed new enterprise process P1) that can be executed both existing enterprise processes J1 and J4. In other words, the new enterprise process P1 included in the integrated solution package can functionally operate with both existing enterprise processes J1 and J4. Specifically, because the existing enterprise processes J1 and J4 already include interfaces with the new enterprise process P1, the integrated solution package can be configured so that the proposed new enterprise process P1 included in the integrated solution package can operate with the existing interfaces included in the existing enterprise processes J1 and J4.

In some embodiments, the interfaces included in the existing enterprise processes J1 and J4 can be modified (e.g., replaced by different/upgraded versions) so that the existing enterprise processes J1 and J4 can compatibly operate with the integrated solution package including the new enterprise process P1. An example of an integrated solution package defined based on the proposed integrated solution package H1 is shown in FIG. 5B.

Figure 5B:
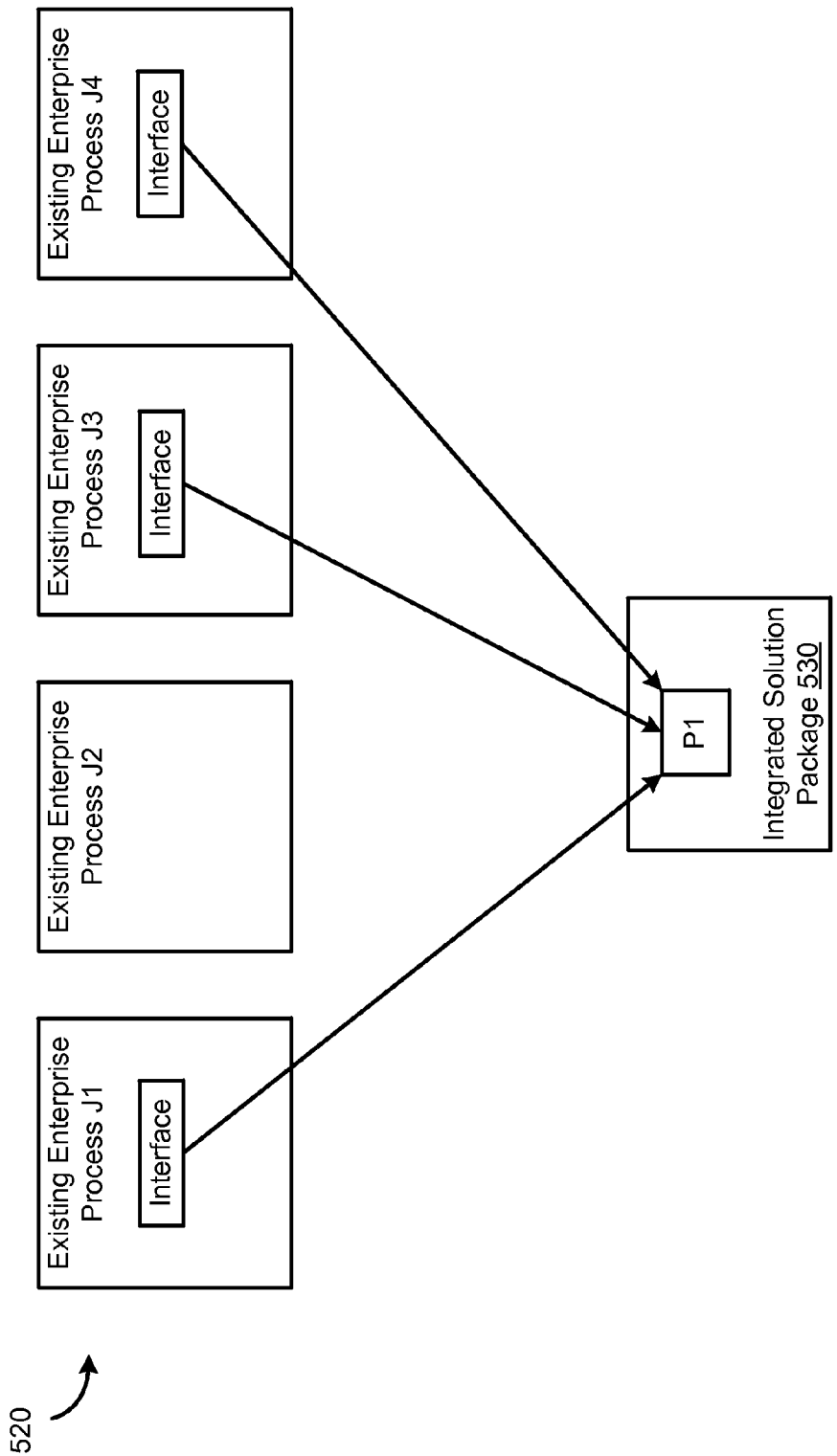
FIG. 5B illustrates an integrated solution package defined based on the proposed integrated solution package shown in FIG. 5A.

FIG. 5B illustrates an integrated solution package 530 defined based on the proposed integrated solution package H1 shown in FIG. 5A. The integrated solution package 530 includes new enterprise process P1 that operates with existing enterprise process J1 and existing enterprise process J4 (as illustrated in FIG. 5A). As shown in FIG. 5B, the new enterprise process P1 of integrated solution package 530 is configured to operate via the interfaces included in existing enterprise process J1 and existing enterprise process J4. In this embodiment, the interfaces included in existing enterprise process J1 and existing enterprise process J4 have been activated so that existing enterprise process J1 and existing enterprise process J4 can operate with the functionality of new enterprise process P1.

Although not shown in FIG. 5B, in some embodiments, the integrated solution package 530 can also include one or more interfaces through which the integrated solution package 530 (e.g., the new enterprise process P1 included in the integrated solution package 530) can operate with the existing enterprise processes J1 and J4. In some embodiments, the interfaces included in existing enterprise processes J1 and J4 can be removed (e.g., uninstalled) and the existing enterprise processes J1 and J4 and integrated solution package 530 can be configured to operate via one or more interfaces included in only the integrated solution package 530. Although not shown, a proposed interface that can be implemented in the integrated solution package 530 can be represented in the proposed solution package H1 (shown in FIG. 5A).

Referring back to FIG. 5A, the solid arrows Q and T between existing enterprise process J1 and J4, respectively, and the proposed new enterprise process P1 included in the proposed solution package H1 represent mandatory operational relationships (i.e., proposed mandatory operational relationships) between the existing enterprise processes J1 and J4 and the proposed new enterprise process P1 included in the proposed solution package H1. If an integrated solution package is defined based on the proposed solution package H1 the integrated solution package must be configured to operate with both existing enterprise processes J1 and J4 because the proposed operational relationships between proposed new enterprise process P1 included in proposed solution package H1 and existing enterprise processes J1 and J4 are proposed mandatory operational relationships. The solid arrow R between existing enterprise process J3 and the proposed new enterprise process P1 included in the proposed solution package H1 also represents a proposed mandatory operational relationship.

The proposed mandatory operational relationships between the existing enterprise processes J1, J3, and J4 and the proposed new enterprise process P1 included in proposed solution package H1 are contrasted with the proposed operational relationship between the existing enterprise process J2 and the proposed new enterprise process P1 included in proposed solution package H1. The proposed operational relationship between existing enterprise process J2 and the proposed new enterprise process P1 included in the proposed solution package H1 is an optional operational relationship (i.e., a proposed optional operational relationship) as represented by the dashed arrow S. If an integrated solution package is defined based on the proposed solution package H1 the integrated solution package may optionally be configured to operate with existing enterprise processes J2 because the proposed operational relationships between proposed new enterprise process P1 included in proposed solution package H1 and existing enterprise processes J2 is a proposed optional operational relationship.

In some embodiments, the classification of an operational relationship as a particular type of operational relationship (e.g., mandatory operational relationship, an optional operational relationship) can be determined based on the enterprise process definition associated with an existing enterprise process and/or one or more parameter values associated with a proposed solution package. For example, the proposed operational relationship between existing enterprise process J2 and proposed new enterprise process P1 included in the proposed solution package H1 can be classified as an optional operational relationship (as represented by arrow S) based on an enterprise process definition associated with existing enterprise process J2 and/or based on integration features as defined within the propose solution package H1. As another example, the proposed mandatory operational relationship (as represented by arrow Q) between existing enterprise process J1 and proposed new enterprise process P1 included in the proposed solution package H1 can be classified as a mandatory operational relationship based on an enterprise process definition associated with existing enterprise process J1. The enterprise process definition associated with existing enterprise process J1 can indicate that new enterprise process P1 is a mandatory new enterprise process, and thus, integration of new enterprise process P1 into an integrated solution package must be mandatory.

As shown in FIG. 5A, neither existing enterprise process J2 nor existing enterprise process J3 include interfaces that can be activated to enable operation with new enterprise process P1. In other words, neither existing enterprise process J2 nor existing enterprise process J3 include dormant interfaces to enable operation with new enterprise process P1. However, as shown by the proposed operational relationships represented by arrows S and R, an integrated solution package can be defined to operate with existing enterprise processes J2 and J3. Specifically, the functionality of the proposed new enterprise process P1 included in proposed solution package H1 can be made available to existing enterprise processes J2 and J3 in an integrated solution package defined based on proposed solution package H1. If an integrated solution package is defined based on the proposed solution package H1, the integrated solution package must be configured to operate with existing enterprise process J2 because the proposed operational relationship between proposed new enterprise process P1 included in proposed solution package H1 and existing enterprise processes J2 is a proposed mandatory operational relationship. However, if an integrated solution package is defined based on the proposed solution package H1, the integrated solution package may optionally be configured to operate with existing enterprise process J3 because the proposed operational relationship between proposed new enterprise process P1 and existing enterprise processes J3 is a proposed optional operational relationship. In some embodiments, a user can trigger (or not trigger) defining of the integrated solution package so that the integrated solution package can operate with existing enterprise process J3.

Referring again to FIG. 5B, the new enterprise process P1 included in the integrated solution package 530 is configured to operate with existing enterprise process J3 (e.g., a new enterprise process within existing enterprise process J3) via an interface included in existing enterprise process J3. However, the new enterprise process P1 of the integrated solution package 530 is not configured to operate with existing enterprise process J2 because the optional operational relationship between the proposed new enterprise process P1 of the proposed solution package H1 (shown in FIG. 5A) was not triggered for implementation in the integrated solution package 530.

Although not shown in FIG. 5B, in some embodiments, the integrated solution package 530 can also include one or more interfaces through which the integrated solution package 530 (e.g., the new enterprise process P1 included in the integrated solution package 530) can operate with the existing enterprise processes J3. In some embodiments, an interface would not be installed in existing enterprise process J3 and integrated solution package 530 would be configured to operate with existing enterprise process J3 via one or more interfaces included in only the integrated solution package 530.

The arrows shown in FIG. 5B (and the arrows Q, R, S, and T shown in FIG. 5A) originate at the existing enterprise processes 520 and terminate at the integrated solution package 530. The direction of the arrows indicates that the functionality in the integrated solution package 530 (and the proposed integrated solution package H1 shown in FIG. 5A) is triggered at the existing enterprise processes 520. In other words, the existing enterprise processes 520 are configured to trigger the functionality in the integrated solution package 530. In some embodiments, the integrated solution package 530 can be configured to trigger one or more functions included in one or more of the existing enterprise processes 520. In such embodiments, an arrow, for example, can originate at the integrated solution package 530 and terminate at the one or more of the existing enterprise processes 520 to illustrate the triggering direction. In some embodiments, triggering can be bidirectional as represented by, for example, double-sided arrows. In other words, the integrated solution package 530 can be configured to trigger one or more functions included in one or more of the existing enterprise processes 520 and one or more of the existing enterprise processes 520 can be configured to trigger one more functions of the integrated solution package 530.

In some embodiments, the new enterprise process P1 included in the integrated solution package 530 can be an upgrade to one or more of the existing enterprise processes 520 (and/or portions thereof). For example, the new enterprise process P1 included in the integrated solution package 530 can be an upgrade version to the program version of the existing enterprise processes 520 shown in FIG. 5A. Accordingly, the existing enterprise processes 520 may be modified (e.g., upgraded to a different program version) so that the existing enterprise processes 520 may operate with the new enterprise process P1. In some embodiments, modifying the existing enterprise processes 520 may be a prerequisite for the existing enterprise processes 520 to operate with the new enterprise process P1. As a specific example, the new enterprise process P1 included in the integrated solution package 530 may be associated with a program version 5.0 and the existing enterprise processes 520 (shown in FIG. 5A) may be associated with a program version 4.0 (which may not be entirely compatible with program version 5.0). The existing enterprise processes 520 may be upgraded from program version 4.0 to a program version that is compatible with program version 5.0 so that the existing enterprise processes 520 may connect with the new enterprise process P1 included in the integrated solution package 530 in a desirable fashion.

In some embodiments, one or more interfaces included in the existing enterprise processes 520 and/or the integrated solution package 530 can be, or can be associated with, an upgraded version or an installed version. For example, the interface included in existing enterprise process J1 can be changed from an installed version of the interface to an upgraded version of the interface when the integrated solution package 530 is defined. In some embodiments, the integrated solution package 530 can be configured to operate via an installed version of an interface even though the new enterprise process P1 included in the integrated solution package 530 may be an upgraded version.

Figure 6A:
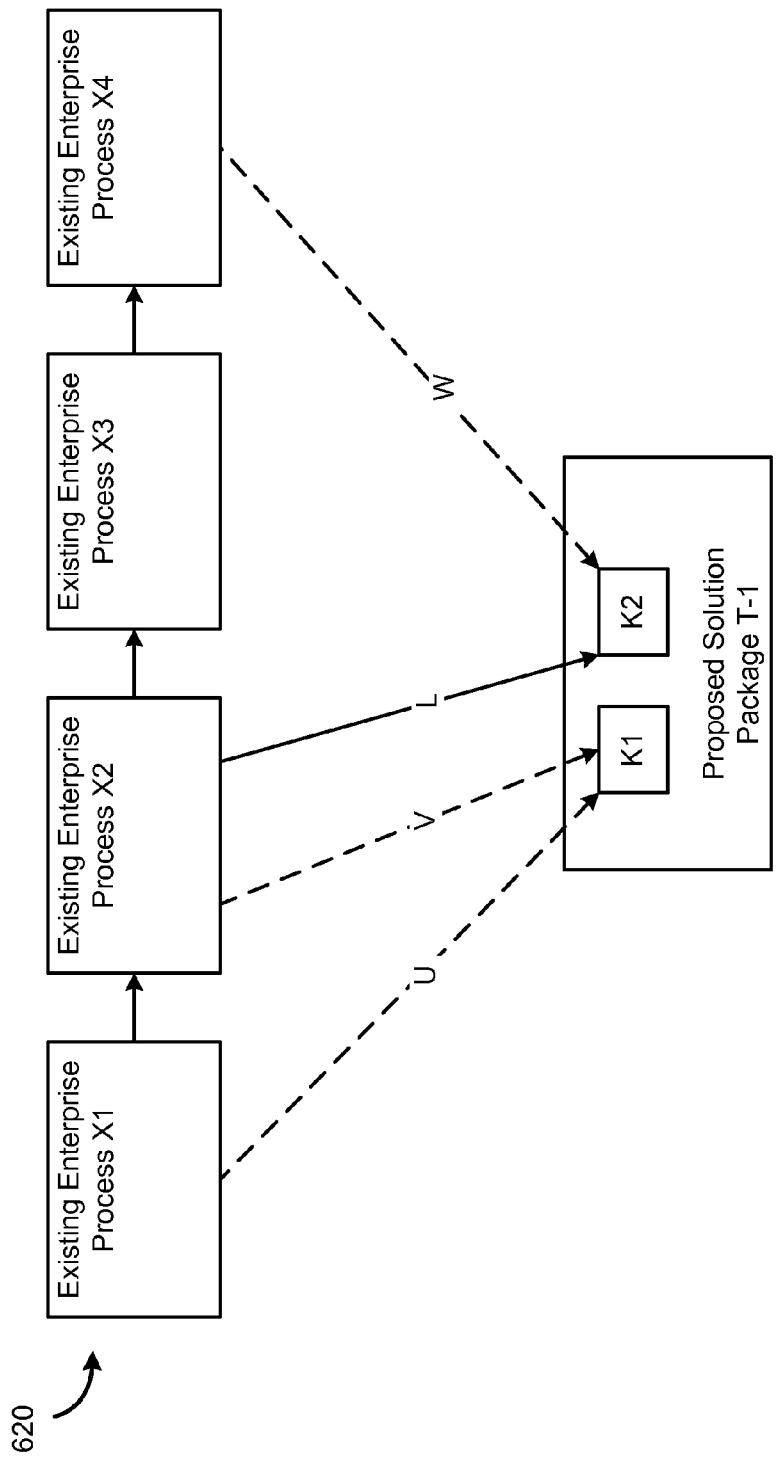
FIG. 6A is a block diagram that illustrates existing enterprise processes and a proposed solution package.

FIG. 6A is a block diagram that illustrates existing enterprise processes 620 and a proposed solution package T-1. FIG. 6A illustrates integration features associated with the proposed solution package T-1 that can be, if selected, implemented in an integrated solution package.

As shown in FIG. 6A, the existing enterprise processes 620 include existing enterprise process X1 through X4. Although not shown in FIG. 6A, each of the existing enterprise processes 620 can include one or more process steps that can each be mandatory process steps or optional process steps. In some embodiments, one or more of the process steps can be triggering process steps (e.g., dormant triggering process steps). In this embodiment, interfaces (which can be included in one or more process steps) at the existing enterprise processes 620 and proposed interfaces at the proposed solution package T-1 are not shown.

In this embodiment, the existing enterprise processes X1 through X4 collectively define an end-to-end existing enterprise process as represented in FIG. 6A by arrows between the existing enterprise processes 620. For example, data produced by existing enterprise process X1 can be processed by existing enterprise process X2 as represented by the arrow between existing enterprise process X1 and existing enterprise process X2.

In some embodiments, the existing enterprise processes X1 through X4 can be any type of enterprise process. For example, the existing enterprise process X1 can be a quotation enterprise process, the existing enterprise process X2 can be a sales order from stock enterprise process, the existing enterprise process X3 can be an outbound delivery enterprise process, and the existing enterprise process X4 can be an post goods issue enterprise process.

As shown in FIG. 6A, the proposed solution package T-1 includes proposed new enterprise processes K1 and K2. The new enterprise processes K1 and K2 included in the proposed solution package T-1 can be considered upgrades to the existing enterprise processes 620. For example, the proposed new enterprise process K2 included in proposed solution package T-1 can include upgraded functionality that can operate with (e.g., can be accessed by, can be triggered by) existing enterprise process X2.

As shown in FIG. 6A, a proposed optional operational relationship between existing enterprise process X1 and the proposed new enterprise process K1 of proposed solution package T-1 is represented by dashed arrow U. A proposed optional operational relationship between existing enterprise process X2 and the proposed new enterprise process K1 of proposed solution package T-1 is represented by dashed arrow V. A proposed mandatory operational relationship between existing enterprise process X2 and the proposed new enterprise process K2 of proposed solution package T-1 is represented by solid arrow L. A proposed optional operational relationship between existing enterprise process X4 and the proposed new enterprise process K2 of proposed solution package T-1 is represented by solid arrow W.

In some embodiments, the new enterprise processes K1 and K2 can be any type of enterprise process. For example, the new enterprise process K1 can be a credit check enterprise process, and the new enterprise process K2 can be a credit update enterprise process.

Figure 6B:
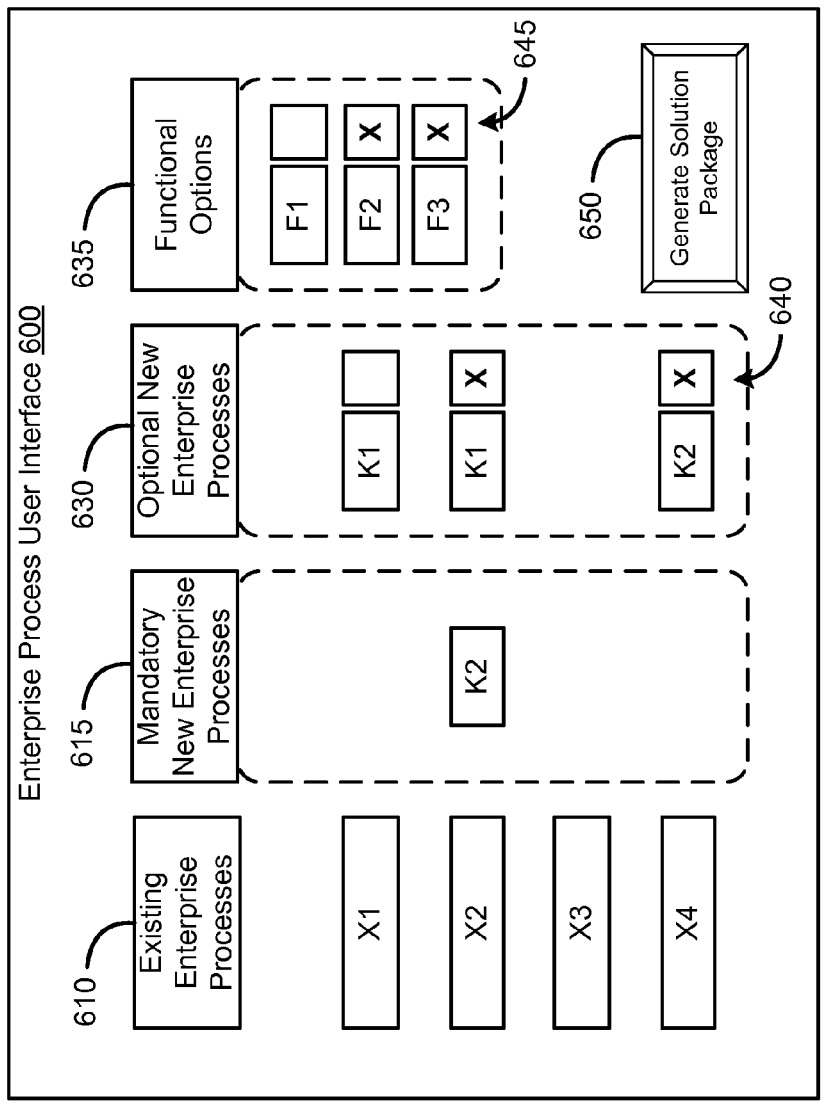
FIG. 6B is a block diagram that illustrates an enterprise process user interface that can be used to select one or more integration features proposed in association with the proposed solution package shown in FIG. 6A.

FIG. 6B is a block diagram that illustrates an existing enterprise process user interface 600 that can be used to select one or more integration features proposed in association with proposed solution package T-1 shown in FIG. 6A. The existing enterprise processes X1 through X4 are represented in a column associated with "Existing Enterprise Processes" 610.

As shown in FIG. 6B, proposed new enterprise process K1 (shown as "K1") is illustrated in a column associated with "Optional New Enterprise Processes" 630 as being an optional new enterprise process that can operate with existing enterprise process X1 in an integrated solution package. The placement of proposed new enterprise process K1 in association with existing enterprise process X1 in the enterprise process user interface 600 is a representation of the proposed optional operational relationship V (shown in FIG. 6A). Similarly, proposed new enterprise process K1 is also illustrated in the column associated with "Optional New Enterprise Processes" 630 as being an optional new enterprise process that can operate with existing enterprise process X2 in an integrated solution package, and proposed new enterprise process K2 (shown as "K2") is illustrated in the column associated with "Optional New Enterprise Processes" 630 as being an optional new enterprise process that can operate with existing enterprise process X4 in an integrated solution package.

Each of the optional new enterprise processes shown in FIG. 6B is placed next to a set of selection boxes 640 that can each be used to select whether or not an integrated solution package should be configured so that one or more of the proposed new enterprise process can operate with one or more of the existing enterprise processes. As shown in FIG. 6B, the "X" in the selection box (from the set of selection boxes 640) next to proposed new enterprise process K2 in the "Optional New enterprise processes" 630 indicates that an integrated solution package, when defined, will enable proposed new enterprise process K2 to operate with existing enterprise process X4. The "X" the selection box next to proposed new enterprise process K2 can represent that the proposed new enterprise process K2 will operate with the existing enterprise process X4 (when implemented in an integrated solution package). The absence of a mark in the selection box next to proposed new enterprise process K1, which is associated with existing enterprise process X1, can represent that new enterprise process K1 will not operate with existing enterprise process X1 in an integrated solution package.

As shown in FIG. 6A, proposed new enterprise process K2 (shown as "K2") is illustrated as a mandatory new enterprise process that must be included in an integrated solution package for the existing enterprise process X2 because proposed new enterprise process K2 is shown in a column associated with "Mandatory New enterprise processes" 615. As shown in FIG. 6B, the proposed new enterprise process K2 is not associated with a selection box, because an integrated solution package must include a binding between the proposed new enterprise process K2 and the existing enterprise process X2.

As shown in FIG. 6B, one or more functional options F1 through F3, which are included in a column associated with "Functional Options" 635, can be selected via the selection boxes 645. A functional option can represent additional selectable functionality associated with one or more of the new enterprise processes. For example, if new enterprise process K2 is a credit check new enterprise process, the functional options F1 through F3 can represent types of credit checks. Functional option F1 can represent a credit limit check, functional option F2 can represent an oldest open item credit check, and functional option F3 can represent a highest dunning level credit check.

The enterprise process user interface 600 also includes a "Generate Solution Package" 650 button. In response to the "Generate Solution Package" 650 button being actuated, an integrated solution package with the selected integration features can be produced by, for example, a solution package generator (such as solution package generator 116 shown in FIG. 1).

In some embodiments, process steps (rather than enterprise processes) can be included in an integrated solution package. Such an example is described in connection with FIG. 7.

Figure 7:
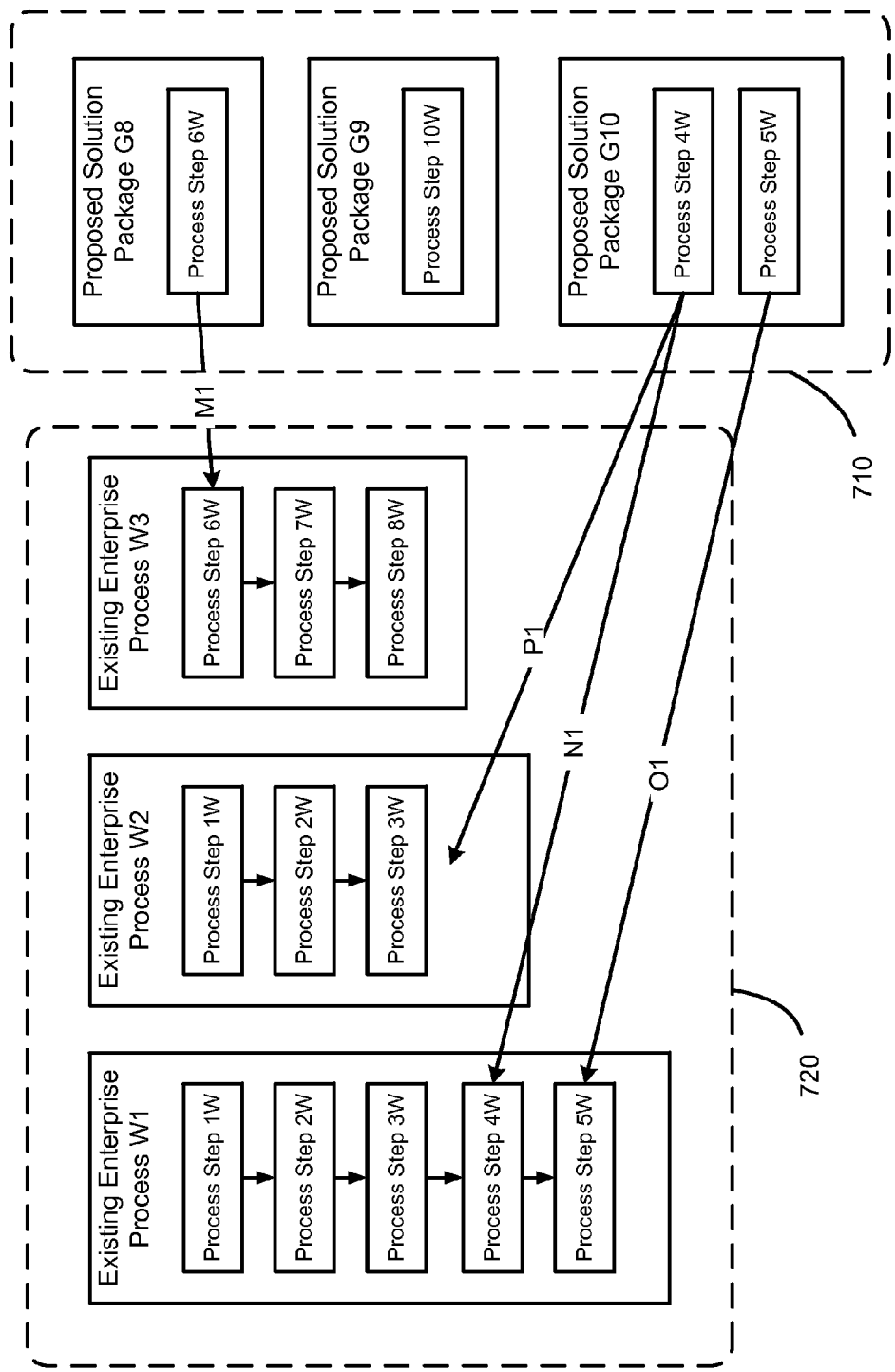
FIG. 7 is a block diagram that illustrates proposed solution packages and existing enterprise processes.

FIG. 7 is a block diagram that illustrates proposed solution packages 710 and existing enterprise processes 720. The proposed solution packages 710 include proposed solution package G8, proposed solution package G9, and proposed solution package W10. The existing enterprise processes 720 include existing enterprise process W1, existing enterprise process W2, and existing enterprise process W3. In this embodiment, the proposed solution packages 710 each include process steps that are an upgrade to an installed version of each of the process steps of the existing enterprise processes 720. Accordingly, the process steps can be referred to as upgrade version process steps. In some embodiments, the process steps included in the proposed solution package 710 can be referred to as proposed process steps. Although not shown in FIG. 7, the process steps of the existing enterprise processes 720 can include any combination of optional process steps and mandatory process steps.

As shown in FIG. 7, proposed process step 6W of the proposed solution package G8 corresponds with process step 6W (which can be referred to as installed process step 6W) included in the existing enterprise process W3 (as represented by arrow Ml). In this embodiment, because the proposed process step 6W of the proposed solution package G8 corresponds with a process step included in only one of the existing enterprise processes 720, the proposed solution package G8 may not be selected for integration of any of the existing enterprise processes 720. In other words, the proposed solution package G8 may not be selected as a potential integrated solution package for integration of any of the existing enterprise processes 720.

As shown in FIG. 7, proposed process steps 4W and 5W of the proposed solution package W10 correspond, respectively, with process steps 4W and 5W (which can be referred to as installed process steps 4W and 5W) included in the existing enterprise process W1 (as respectively represented by arrow N1 and O1). Also, as illustrated by arrow P1, proposed process step 4W of the proposed solution package W10 can be included as a process step after process step 3W of existing enterprise process W2. The inclusion of proposed process step 4W in existing enterprise process W2 can be considered an upgrade to existing enterprise process W2 because proposed process step 4W is currently not included in existing enterprise process W2. Although not shown in FIG. 7, in some embodiments proposed process step 4W could be inserted (as an upgrade) between process steps already included in existing enterprise process W2.

In this embodiment, because the proposed solution package W10 includes at least one process step—proposed process step 4W—associated with existing enterprise processes W1 and W2, the proposed solution package W10 may be selected for integration for at least these existing enterprise processes. In other words, the proposed solution package W10 may be selected as a potential integrated solution package for integration of at least one process step from each of existing enterprise process W1 and existing enterprise process W2.

As shown in FIG. 7, the proposed solution package G8 includes a proposed process step 10G. The proposed process step 10G neither corresponds with a process step from any of the existing enterprise processes 72 nor can be included as a process step after any of the existing enterprise processes 720. Thus, proposed solution package G9 may not be selected for integration of any of the existing enterprise processes 720.

In some embodiments, a proposed solution package can be selected for integration of several existing enterprise processes when the proposed solution package includes multiple process steps (e.g., multiple proposed process steps) that each are associated with only one existing enterprise process. For example, a proposed solution package can include a first process step that corresponds with a process step included in a first existing enterprise process. The proposed solution package can also include a second process step that corresponds with a process step included in a second existing enterprise process. Although each of the process steps of the proposed solution package corresponds with a process step of only one existing enterprise process, the proposed solution package may be used for integration of the first existing enterprise process and the second existing enterprise process because the proposed solution package is associated with multiple existing enterprise processes.

In some embodiments, a proposed solution package may not be selected for integration when a process step (e.g., a proposed process step) of the proposed solution package is not an upgrade to at least one process step from multiple existing enterprise processes. For example, a proposed solution package can include a process step that corresponds with a process step included in a first existing enterprise process and a process step included in a second existing enterprise process. If the process step included in solution package is an upgrade to only the process step included in the first existing enterprise process but not the process step included in the second existing enterprise process, the proposed solution package may not be selected for integration of the first existing enterprise process in the second existing enterprise process.

In some embodiments, the existing enterprise processes 720 (and portions thereof) can be represented by at least one enterprise process definition. In addition, one or more of the conditions described above can be defined within one or more solution package conditions. A proposed solution package manager, such as proposed solution package manager 114 shown in FIG. 1, can be configured to select one or more of the proposed solution packages 710 based on the at least one enterprise process definition and the one or more solution package conditions.

Figure 8:
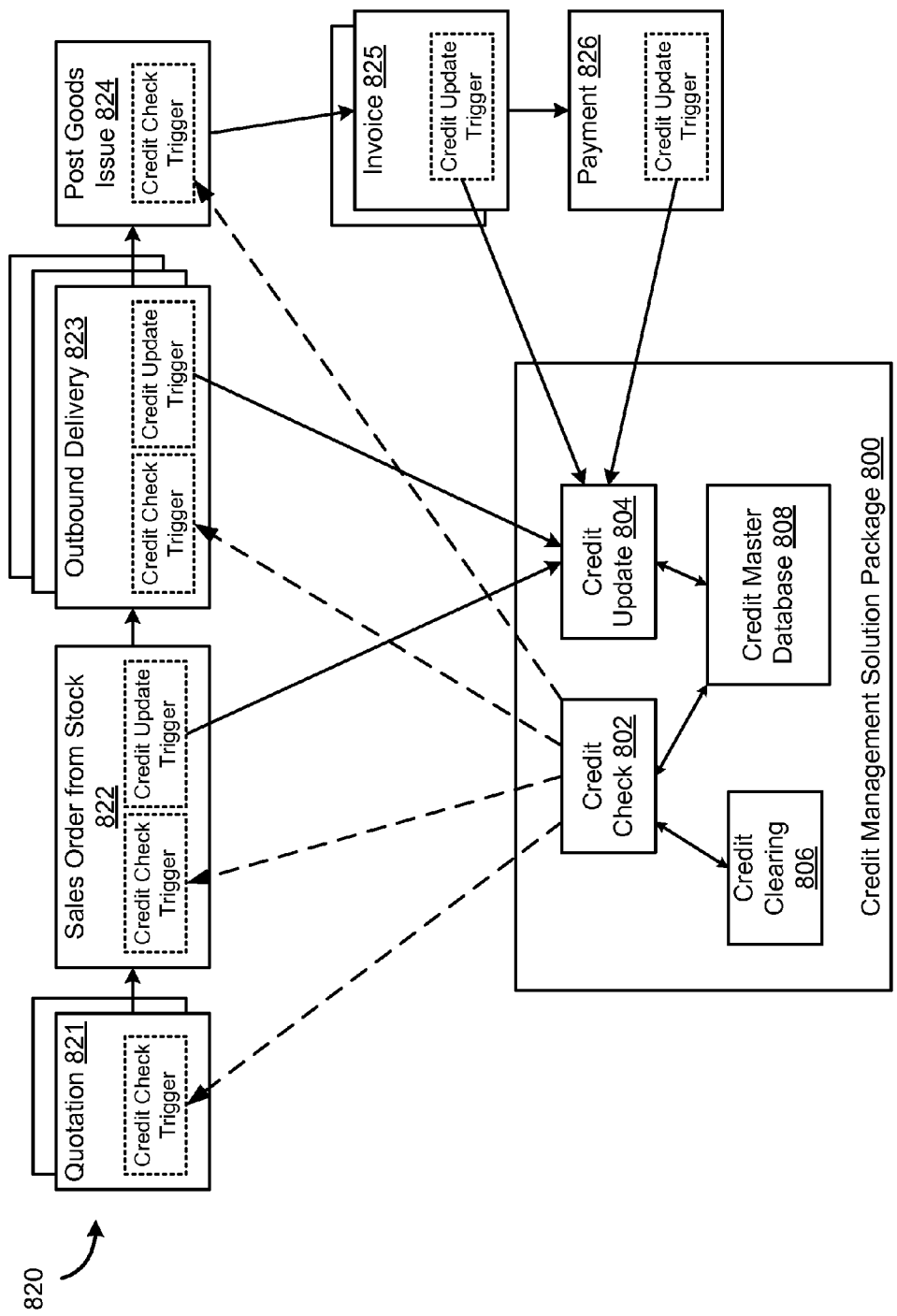
FIG. 8 is a block diagram that illustrates an end-to-end process and a credit management solution package.

FIG. 8 is a block diagram that illustrates an end-to-end process 820 and a credit management solution package 800. As shown in FIG. 8, the process 820 includes several enterprise processes. Specifically, the end-to-end process 820 includes a quotation 821 enterprise process, a sales order from stock 822 enterprise process, an outbound delivery 823 enterprise process, a post goods issue 824 enterprise process, an invoice 125 enterprise process, and a payment 826 enterprise process.

Also as shown in FIG. 8, each of the enterprise processes from the end-to-end enterprise process 820 has an operational relationship with at least one enterprise process from the credit management solution package 800. Mandatory operational relationships are represented by solid arrows between the enterprise processes from the end-to-end enterprise process 820 and the credit management solution package 800. Optional operational relationships are represented by dashed arrows between the enterprise processes from the end-to-end enterprise process 820 and the credit management solution package 800.

The credit management solution package 800 includes a credit check 802 enterprise process, a credit update 804 enterprise process, and a credit clearing 806 enterprise process. The credit management solution package 800 also includes a credit master database 808. As shown in FIG. 8, the credit master database 808 can be accessed by the credit check 802 enterprise process and the credit update 804 enterprise process.

Each of the enterprise processes included in the end-to-end process 820 includes at least one interface configured to trigger one or more functions associated with the credit management solution package 800. Specifically, each of the enterprise processes included in the end-to-end process 820 includes at least one of a credit check trigger or a credit update trigger. For example, the quotation 821 enterprise process includes an instance of the credit check trigger that enables an operational relationship (e.g., a bidirectional operational relationship, a single direction operational relationship) between the credit check 802 enterprise process included in the credit management solution package 800 and the quotation 821 enterprise process. Similarly, the sales order from stock 822 enterprise process includes an instance of the credit update trigger that enables an operational relationship (e.g., a bidirectional operational relationship, a single direction operational relationship) between the credit update 804 enterprise process included in the credit management solution package 800 and the sales order from stock 822 enterprise process. In some embodiments, the credit check trigger and/or the credit update trigger can be included in (as a function), or can be, a process step. In some embodiments, one or more of the interfaces can be dormant interfaces that are (or can be) activated. Although not shown in FIG. 8, in some embodiments less than all of the enterprise processes included in an end-to-end process may have an interface with an integrated solution package.

The boxes behind some of the enterprise processes shown in the end-to-end process 820 represent variants of the respective enterprise processes. For example, the box behind the quotation 822 enterprise process represents a variant of the quotation 822 enterprise process. In some embodiments, the credit check trigger included in the quotation 821 enterprise process can be the same as (e.g., can share) the credit check trigger associated with a variant of the quotation 822 enterprise process. In some embodiments, the credit check trigger associated each of with variants can be different.

In some embodiments the interfaces included in some of the enterprise processes of the end-to-end process 820 can be different. For example, the credit check trigger included in outbound delivery 823 can be different than (e.g., a different version of, a different implementation of) the credit check trigger included in post goods issue 824. In other words, the credit check trigger included in outbound delivery 823 and the credit check trigger included in post goods issue 824 may not be instances of the same credit check trigger.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:
    an enterprise process selection module configured to receive a plurality of enterprise process definitions representing a plurality of existing enterprise processes implemented on a target system;
    a proposed solution package manager configured to select, based on the plurality of enterprise process definitions, a proposed solution package including at least one mandatory new enterprise process and at least one optional new enterprise process based on determining that the proposed solution package can be used to integrate more than one of the plurality of existing enterprise processes;
    a user interface module configured to:
        generate an enterprise process user interface, the enterprise process user interface displaying representations of existing enterprise processes, at least one representation of the at least one mandatory new enterprise process, and at least one selection interface configured to receive a selection of the at least one optional new enterprise process; and
        process the selection of the at least one optional new enterprise process; and
    a solution package generator configured to define, based on the selection of the proposed solution package and the received selection of the at least one optional new enterprise process, an implementation of the new enterprise process in an integrated solution package, the integrated solution package including the at least one mandatory new enterprise process and the selected at least one optional new enterprise process.

2. The computer system of claim 1, wherein the new enterprise process is a first new enterprise process, and the proposed solution package includes a second new enterprise process configured to operate with at least one of a first existing enterprise process or a second existing enterprise process.

3. The computer system of claim 1, wherein:
    a first existing enterprise process includes a first instance of a triggering process step and a second existing enterprise process includes a second instance of the triggering process step, and
    the implementation of the new enterprise process in the integrated solution package is configured to be triggered by the first instance of the triggering process step of the first existing enterprise process and the second instance of the triggering process step included in the second existing enterprise process.

4. The computer system of claim 1, wherein:
    the proposed solution package manager is configured to select the proposed solution package based on the new enterprise process corresponding with an interface included in first existing enterprise process, and
    the implementation of the new enterprise process included in the integrated solution package is compatible with the interface included in a first existing enterprise process.

5. The computer system of claim 1, wherein:
    the new enterprise process is a first new enterprise process, the proposed solution package includes a second new enterprise process corresponding with an interface included in at least one of a first existing enterprise process or a second existing enterprise process,
    the proposed solution package manager is configured to define an indicator of an optional operational relationship between the second new enterprise process and the first existing enterprise process, and
    the solution package generator is configured to receive an indicator that the second new enterprise process has not been selected for binding to the first existing enterprise process.

6. The computer system of claim 1, wherein:
    the new enterprise process is a first new enterprise process configured to operate as a background process,
    the proposed solution package includes a second new enterprise process configured to produce a result that is visible, and
    the proposed solution package manager is configured to define an indicator of an operational relationship between the second new enterprise process and a first existing enterprise process.

7. The computer system of claim 1, wherein:
    the enterprise selection module is configured to determine that the plurality of existing enterprise processes are eligible for integration based on a combination of the plurality of enterprise process definitions and an eligibility condition, and
    the proposed solution package manager is configured to select the proposed solution package based on a combination of the plurality of first and second enterprise process definitions and a solution package condition.

8. The computer system of claim 1, wherein:
a first existing enterprise process is associated with a variant of an existing enterprise process including an optional process step bound to a mandatory process step, and
the new enterprise process included in the proposed solution package is configured to be triggered by at least one of the optional process step or the mandatory process step.

9. The computer system of claim 1, wherein the implementation of the new enterprise process included in the integrated solution package includes an interface compatible with an implementation of a first existing enterprise process and compatible with an implementation of a second existing enterprise process.

10. The computer system of claim 1, wherein:
a first existing enterprise process is configured to process data produced by an implementation of a second existing enterprise process,
the implementation of the new enterprise process included in the integrated solution package includes an interface through which the implementation of the first existing enterprise process is configured to trigger execution of at least a portion of the new enterprise process, and through which the implementation of the second existing enterprise process is configured to trigger execution of the new enterprise process.

11. The computer system of claim 1, wherein:
a first existing enterprise process includes a first process step configured to process data produced by a second process step from a second existing enterprise process, and
the first existing enterprise process and the second existing enterprise process collectively define at least a portion of an end-to-end process.

12. The computer system of claim 1, wherein:
a first existing enterprise process includes a first instance of a triggering process step and a second existing enterprise process includes a second instance of the triggering process step, and
the new enterprise process of the proposed solution package is an upgrade compatible with at least one of the first instance of the triggering process step or the second instance of the triggering process step.

13. The computer system of claim 1, wherein:
the implementation of the new enterprise process in the integrated solution package has a function configured to be triggered from a first existing enterprise process and from a second existing enterprise process, and
the integrated solution package is configured to trigger a function included in at least one of a first existing enterprise process or a second existing enterprise process.

14. The computer system of claim 1, wherein:
an association between the new enterprise process and a first existing enterprise process represents a mandatory operational relationship;
an association between the new enterprise process and a second existing enterprise process represents an optional operational relationship; and
the solution package manager is configured to define, based on the mandatory and optional operational relationships, the integrated solution package operating with the first existing enterprise process and optionally operating with the second existing enterprise process.

15. The computer system of claim 14, wherein:
the proposed solution package manager is a first proposed solution package and the new enterprise process is a first new enterprise process,
the proposed solution package manager is configured to select, based on the plurality of enterprise process definitions, a second proposed solution package that includes a second new enterprise process,
the proposed solution package manager is configured to define an indicator of the mandatory operational relationship and an indicator of the optional operational relationship in response to an indicator that the first proposed solution package has been selected by a user.

16. A non-transitory computer-readable storage medium storing code representing instructions that when executed are configured to cause a processor to perform a process, the code comprising code to:
receive a plurality of enterprise process definitions representing a plurality of existing enterprise processes implemented on a target system;
select, based on the plurality of enterprise process definitions, at least one mandatory proposed solution package including a new enterprise process and at least one optional enterprise process based on determining that the proposed solution package can be used to integrate more than one of the plurality of existing enterprise processes;
generate an enterprise process user interface, the enterprise process user interface displaying representations of existing enterprise processes, at least one representation of the at least one mandatory new enterprise process, and at least one selection interface configured to receive a selection of the at least one optional new enterprise process;
process the selection of the at least one optional new enterprise process; and
define, based on the selection of the proposed solution package and the received selection of the at least one optional new enterprise process, an implementation of the new enterprise process with the plurality of existing enterprise processes in an integrated solution package, the integrated solution package including the at least one mandatory new enterprise process and the selected at least one optional new enterprise process.

17. The non-transitory computer-readable storage medium of claim 16, further comprising code to:
define, based on an indicator of an optional operational relationship selection, an implementation of the new enterprise process in an integrated solution package compatible with an interface included in a first existing enterprise process, the proposed solution package being selected based on the new enterprise process corresponding with the interface included in the first existing enterprise process.

18. The non-transitory computer-readable storage medium of claim 16, further comprising code to:
define, based on an indicator of an optional operational relationship selection, an implementation of the new enterprise process in an integrated solution package, a first existing enterprise process including a first instance of a triggering process step and a second existing enterprise process including a second instance of the triggering process step, the implementation of the new enterprise process in the integrated solution package configured to be triggered by the first instance of the triggering process step of the first existing enterprise process and the second instance of the triggering process step included in the second existing enterprise process.

19. The non-transitory computer-readable storage medium of claim 16, wherein the new enterprise process is a first new enterprise process, the proposed solution package includes a second new enterprise process configured to operate with at least one of a first existing enterprise process or a second existing enterprise process.

20. A method including executing instructions recorded on a non-transitory computer-readable storage media using at least one processor, the method comprising:

receiving a plurality of enterprise process definitions representing a plurality of existing enterprise processes implemented on a target system;

selecting, based on the plurality of enterprise process definitions, a proposed solution package including at least one mandatory new enterprise process and at least one optional new enterprise process based on determining that the proposed solution package can be used to integrate more than one of the plurality of existing enterprise processes;

generating an enterprise process user interface, the enterprise process user interface displaying representations of existing enterprise processes, at least one representation of the at least one mandatory new enterprise process, and at least one selection interface configured to receive a selection of the at least one optional new enterprise process;

processing the selection of the at least one optional new enterprise process; and defining, based on the selection of the proposed solution package and the received selection of the at least one optional new enterprise process, an implementation of the new enterprise process in an integrated solution package, the integrated solution package including the at least one mandatory new enterprise process and the selected at least one optional new enterprise process.

\* \* \* \* \*